US010587515B2

(12) United States Patent
Azgin et al.

(10) Patent No.: US 10,587,515 B2
(45) Date of Patent: Mar. 10, 2020

(54) STATELESS INFORMATION CENTRIC FORWARDING USING DYNAMIC FILTERS

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 381 days.

(21) Appl. No.: 15/426,336

(22) Filed: Feb. 7, 2017

(65) Prior Publication Data

US 2018/0227230 A1     Aug. 9, 2018

(51) Int. Cl.
*H04L 12/741* (2013.01)
*H04W 12/04* (2009.01)

(52) U.S. Cl.
CPC ........... *H04L 45/745* (2013.01); *H04W 12/04* (2013.01)

(58) Field of Classification Search
None
See application file for complete search history.

(56) References Cited

U.S. PATENT DOCUMENTS

| 2002/0118692 | A1* | 8/2002 | Oberman | H04L 12/5601 370/419 |
| 2006/0209852 | A1* | 9/2006 | Wakumoto | H04L 45/02 370/401 |
| 2006/0268944 | A1* | 11/2006 | Xu | H04Q 11/0062 370/351 |
| 2014/0036918 | A1* | 2/2014 | Varvello | H04L 45/306 370/392 |
| 2014/0095605 | A1* | 4/2014 | Varvello | H04L 67/108 709/204 |
| 2014/0204945 | A1* | 7/2014 | Byun | H04L 45/74 370/392 |

(Continued)

OTHER PUBLICATIONS

Ghali, Cesar, et al., "Living in a PIT-LESS World: A Case Against Stateful Forwarding in Content-Centric Networking," Networking and Internet Architecture, arXiv:1512.07755 [cs.NI]; Dec. 24, 2015, 10 pages.

(Continued)

*Primary Examiner* — Hassan A Phillips
*Assistant Examiner* — Gautam Sharma
(74) *Attorney, Agent, or Firm* — Vierra Magen Marcus LLP

(57) ABSTRACT

Technology for stateless forwarding of packets in an ICN is disclosed. Content routers modify a dynamic filter in an interest packet. In one aspect, a content router extracts a dynamic filter from an interest packet received on an ingress port and combines the dynamic filter with a local filter associated with the ingress port. The packet filter and the local filter may be combined without losing information in the packet filter or the local filter. A new filter may be inserted into the interest packet based on the combined packet filter and local filter. The interest packet having the new filter may be forwarded on an egress port. The data packet that returns the content object for the interest packet may be forwarded statelessly based on the dynamic filter. Thus, the data packet may be forwarded without use of a pending interest table (PIT).

20 Claims, 15 Drawing Sheets

(56) References Cited

U.S. PATENT DOCUMENTS

| | | | | |
|---|---|---|---|---|
| 2015/0095483 | A1* | 4/2015 | Muramoto | G06Q 10/00 709/223 |
| 2015/0095514 | A1* | 4/2015 | Yu | H04W 4/70 709/242 |
| 2015/0117449 | A1* | 4/2015 | Mosko | H04L 45/7453 370/392 |
| 2015/0350078 | A1* | 12/2015 | Azgin | H04L 45/306 370/392 |
| 2016/0094553 | A1 | 3/2016 | Azgin et al. | |
| 2016/0105394 | A1* | 4/2016 | Rangarajan | H04L 61/302 709/223 |

OTHER PUBLICATIONS

Tsilopoulos, Christos, et al., "Reducing Forwarding State in Content-Centric Networks with Semi-Stateless Forwarding," IEEE Infocom 2014, Feb. 2014, 10 pages.

Azgin, Aytac, et al., "A Flow-Driven Fast Forwarding Architecture for Content Centric Networks," Research Gate, Conference Paper, Jun. 2015, 8 pages.

Azgin, Aytac, et al., "H2N4: Packet Forwarding on Hierarchical Hash-based Names for Content Centric Networks," Research Gate, Conference Paper, Jun. 2015, 8 pages.

Garcia-Luna-Aceves, J.J., et al., "A Light-Weight Forwarding Plane for Content-Centric Networks," 2016 International Conference on Computing, Networking and Communications, Social Computing and Semantic Data Mining, Feb. 2016, 8 pages.

Zhang, Lixia, et al., "Named Data Networking," ACM SIGCOMM Computer Communication Review, vol. 44, No. 3, Jul. 2014, 8 pages.

Azgin, Aytac, et al., "pit/LESS: Stateless Forwarding in Content Centric Networks," Research Gate, Conference Paper, Dec. 2016, 8 pages.

Alzahrani, Bander A., et al., "Resistance Against Brute-Force Attacks on Stateless Forwarding in Information Centric Networking," Research Gate, Jul. 2015, 3 pages.

Wang, Jin, et al., "An Optimal Cache Management Framework for Information-Centric Networks with Network Coding," 2014 IFIP Networking Conference, Jun. 2014, 9 pages.

Westphal, Cedric, et al., "A Bloom Filter Approach for Scalable CCN-based Discovery of Missing Physical Objects," 2016 13th IEEE Annual Consumer Communications & Networking Conference (CCNC), Jan. 2016, 6 pages.

* cited by examiner

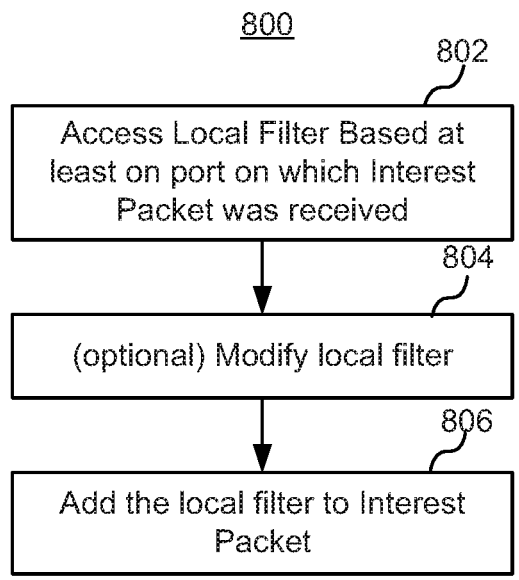
FIG. 8
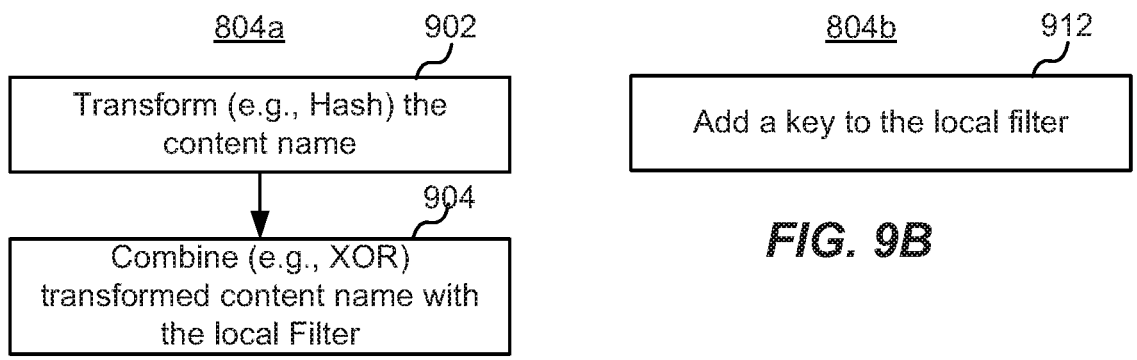
FIG. 9A
FIG. 9B
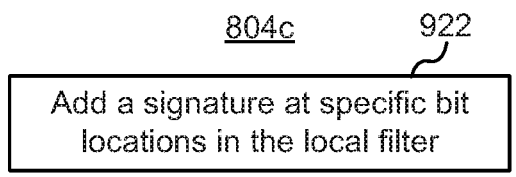
FIG. 9C

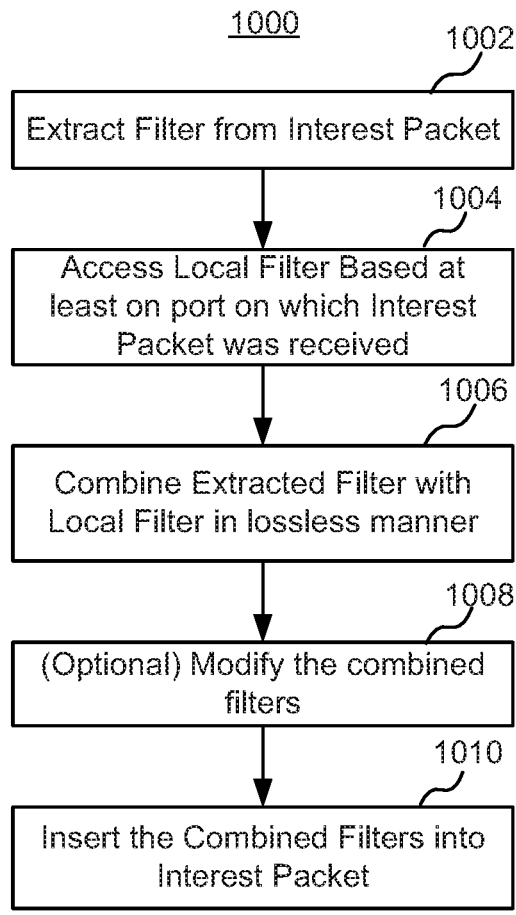
FIG. 10
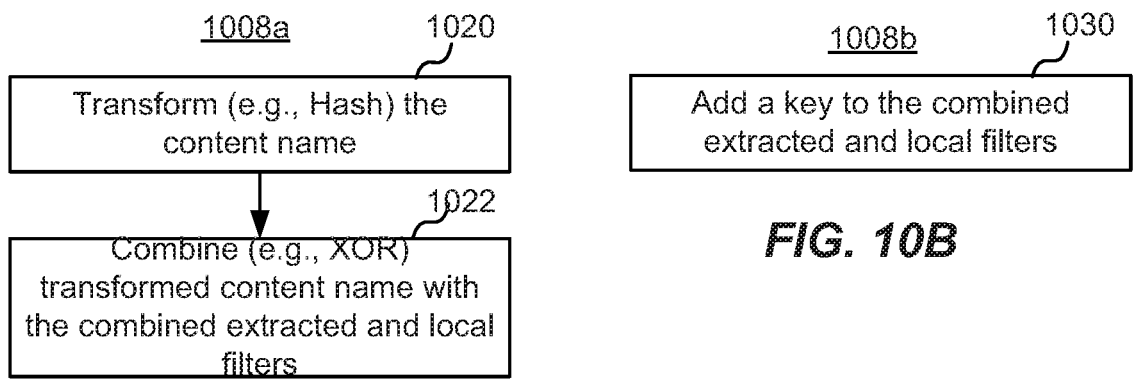
FIG. 10A
FIG. 10B
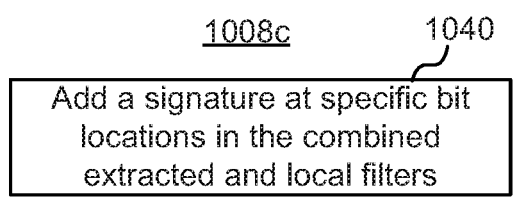
FIG. 10C

STATELESS INFORMATION CENTRIC FORWARDING USING DYNAMIC FILTERS

BACKGROUND

In the traditional TCP/IP (Transmission Control Protocol/Internet Protocol) model, the client requesting some content needs to first map the URL (Uniform Resource Locator) in the name of the content to a server. This server will mostly stay the same for the length of the session. The session is actually bound to this server, and the session's goal is to transfer the specific content held from this server. In such host-centric networking paradigm, the core networking primitives revolve around naming hosts and network interfaces. Network devices can only forward packets according to the destination addresses.

Recently, information-centric networking (ICN) has been proposed. Examples of ICN include, but are not limited to, Named Data Networking (NDN), Content Centric Networking (CCN), Content Oriented Networking (CON), Data Oriented Networking (DON), and Content Based Networking (CBN). Unlike traditional host-centric networking, information is directly named in an ICN. Thus, ICN allows a client device to focus on the data needed, as opposed to referencing a specific location from which the data may be retrieved.

For example, in CCN, a client node may send an interest packet to the network when the client wants to access a piece of a content object. Routers in the network then forward the interest packet using the name of the interest for routing. Once the interest packet reaches a cache holding a match for the interest, a content return packet (e.g., "data packet") may be sent back. The content return packet may retrace the path followed by the interest packet in the reverse direction to the client node which requested the content.

BRIEF SUMMARY

In a first embodiment, there is an apparatus comprising: a non-transitory memory storage comprising instructions; and one or more processors in communication with the memory. The one or more processors execute the instructions to extract a packet filter from an interest packet received at a first port of the plurality of ports. The one or more processors execute the instructions to combine the packet filter with a local filter associated with the first port. The packet filter and the local filter are combined without losing information in the packet filter or the local filter. The one or more processors execute the instructions to insert a new filter into the interest packet based on the combined packet filter and local filter. The one or more processors execute the instructions to forward the interest packet having the new filter on a second port of the plurality of ports.

In a second embodiment according to the first embodiment to combine the packet filter with the local filter the one or more processors execute the instructions to include all bits from the packet filter and the local filter in the new filter.

In a third embodiment according to any of the first through second embodiments to combine the packet filter with the local filter the one or more processors execute the instructions to concatenate all bits from the packet filter with all bits of the local filter.

In a fourth embodiment according to any of the first through third embodiments, the packet filter is a first packet filter, the one or more processors execute the instructions to: extract a second packet filter from a data packet received at a port of the plurality of ports; perform an inverse of the combining of the first packet filter with the local filter on bits derived from the new filter to determine the local filter; and determine a port of the plurality of ports on which to forward the data packet based on the local filter.

In a fifth embodiment according to any of the first through fourth embodiments the one or more processors execute the instructions to transform the combined packet filter and local filter with information from the interest packet to form the new filter.

In a sixth embodiment according to any of the first through fifth embodiments the packet filter is a first packet filter. The one or more processors execute the instructions to extract a second packet filter from a data packet received at a port of the plurality of ports; perform an inverse of the transform of the combined packet filter and local filter on the second packet filter; perform an inverse of the combining of the first packet filter with the local filter on the second packet filter to determine the local filter; and determine a port of the plurality of ports on which to forward the data packet based on the local filter.

In a seventh embodiment according to any of the first through sixth embodiments the one or more processors execute the instructions to perform a security check of the data packet based on a comparison of a content name in the data packet with a portion of results of performing the inverse of the transform.

In an eighth embodiment according to any of the first through seventh embodiments the packet filter is a first packet filter. The one or more processors execute the instructions to add a first key to the local filter prior to inserting the new filter into the interest packet; extract a second packet filter from a data packet received at a port of the plurality of ports; extract a second key from the second packet filter; drop the data packet if the second key does not match the first key; and forward the data packet on a port of the plurality of ports if the second key does match the first key.

In a ninth embodiment according to any of the first through eighth embodiments the packet filter is a first packet filter. The one or more processors execute the instructions to add a first signature to the new filter prior to inserting the new filter into the interest packet; extract a second packet filter from a data packet received at a port of the plurality of ports; extract a second signature from the second packet filter; drop the data packet if the second signature does not match the first signature; and forward the data packet on a port of the plurality of ports if the second signature does match the first signature.

In a tenth embodiment according to any of the first through ninth embodiments the packet filter is a first packet filter. The local filter defines both the first port and the second port, wherein the one or more processors execute the instructions to extract a second packet filter from a data packet received at a port of the plurality of ports; determine the second port from the second packet filter; drop the data packet if the second port does not match the port on which the data packet was received; and forward the data packet if the second port does match the port on which the data packet was received.

In an eleventh embodiment there is a method for forwarding packets in an information centric network (ICN). The method comprises extracting a packet filter from an interest packet received at an ingress port of a content router in the ICN; losslessly combining the packet filter with a local filter that is based on the ingress port. Losslessly combining the packet filter with the local filter does not lose information in the packet filter or the local filter. The method further comprises inserting a new filter into the interest packet based on the losslessly combined packet filter and local filter; and forwarding the interest packet having the new filter on an egress port of the content router.

In a twelfth embodiment according to the eleventh embodiment the packet filter is a first packet filter. The method further comprises: extracting a second packet filter from a data packet received at a port of the content router; and statelessly forwarding the data packet based on the second packet filter.

In a thirteenth embodiment according to any of the eleventh through twelfth embodiments, the method further comprises: transforming information from the interest packet; and combining the transformed information with the losslessly combined packet filter and the local filter to form the new filter.

In a fourteenth embodiment according to the thirteenth embodiment the information from the interest packet comprises a content name.

In a fifteenth embodiment according to any of the thirteenth through fourteenth embodiments, the packet filter is a first packet filter. The method further comprises: extracting a second packet filter from a data packet received at a port of the content router; performing an inverse of the combining the transformed information with the losslessly combined packet filter and local filter on the second packet filter; performing an inverse of the transforming of the information from the interest packet on results of performing the inverse of the combining; determining a local filter based on results of performing the inverse of the transforming; determining a port of the content router based on the determined local filter; and forwarding the data packet on the determined port.

In a sixteenth embodiment, a content router comprises: a plurality of ports; a non-transitory memory storage comprising instructions; and one or more processors in communication with the memory. The one or more processors execute the instructions to: receive an interest packet at a port of the plurality of ports; determine a first array of bits from a filter field in the interest packet; combine the first array of bits with a second array of bits that define the port on which the interest packet was received to form a third array of bits. The first and second arrays of bits are combined without losing any bits in either the first or the second array. The one or more processors execute the instructions to: insert a filter into the interest packet based on the third array of bits; and forward the interest packet having the filter on a port of the content router.

In a seventeenth embodiment, in accordance with the sixteenth embodiment, the one or more processors execute the instructions to: transform a content name in the interest packet; and combine the transformed content name with the third array of bits to form the filter.

In an eighteenth embodiment, in accordance with any of the sixteenth through seventeenth embodiments the one or more processors execute the instructions to: receive a data packet at a port of the plurality of ports; perform an inverse of combining the transformed content name with the third array of bits on a filter from a filter field in the data packet; and determine a port of the plurality of ports on which to forward the data packet based on a first portion of results of performing the inverse of the combining.

In a nineteenth embodiment, in accordance with any of the sixteenth through eighteenth embodiments the one or more processors execute the instructions to: access a second portion of the results of performing the inverse of the combining; and perform a security check of the data packet based on a comparison of the second portion with a key or signature.

In a twentieth embodiment, in accordance with any of the sixteenth through nineteenth embodiments the second array of bits further defines the port of the content router on which the interest packet is forwarded.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 8 is a flowchart of one embodiment of a process of interest packet processing.

FIGS. 9A, 9B and 9C are flowcharts of embodiments of processes for modifying a local filter.

FIG. 10 is a flowchart of one embodiment of a process of interest packet processing.

FIG. 10A is a flowchart of one embodiment of step 1008 of FIG. 10

FIG. 10B is a flowchart of one embodiment of step 1008 of FIG. 10.

FIG. 10C is a flowchart of one embodiment of a process of modifying the combined filters.

DETAILED DESCRIPTION

Figure 1:
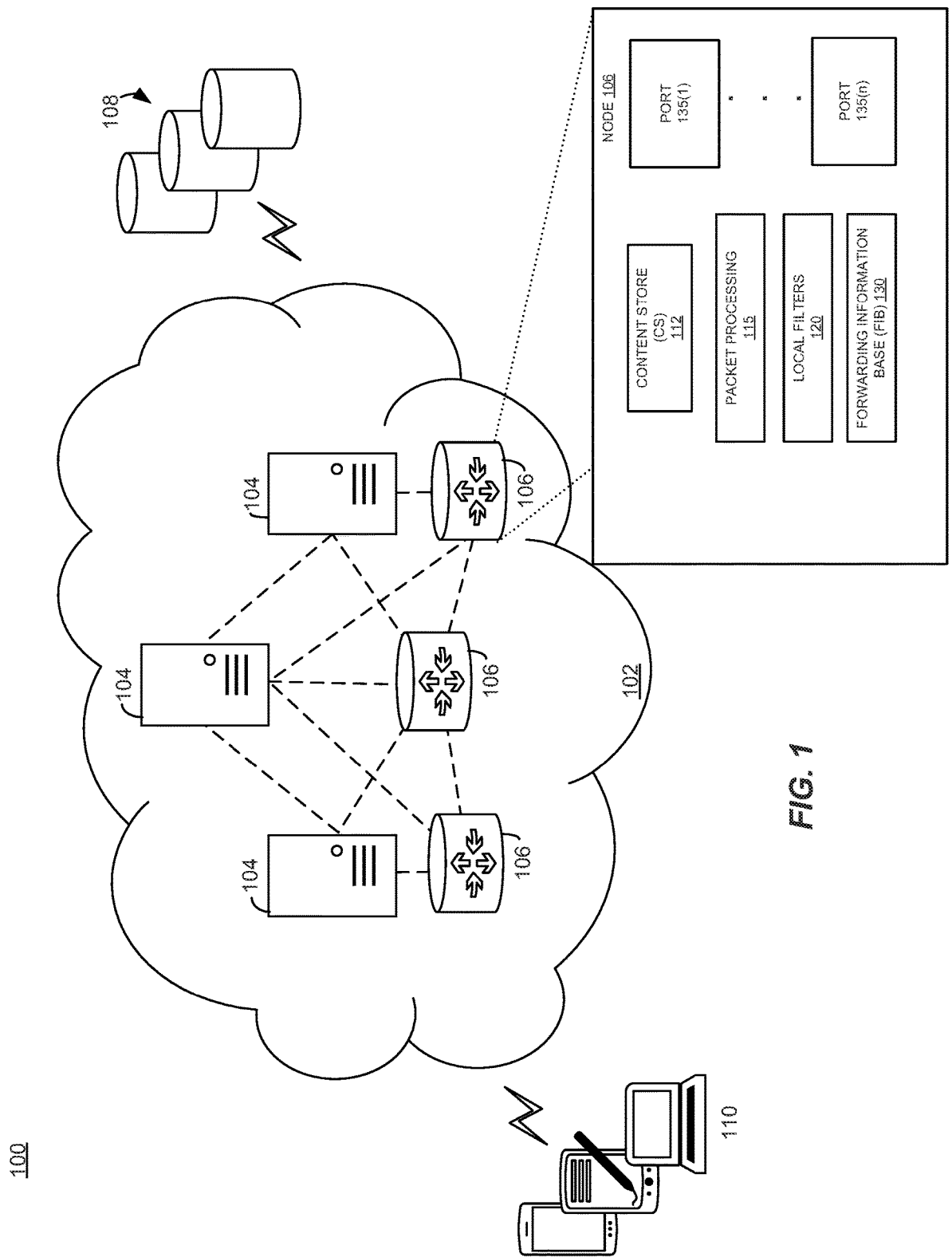
FIG. 1 illustrates a network environment to provide content as requested by different users in an information centric network (ICN).

The disclosure relates to technology for stateless forwarding of packets in an ICN. The packets include, but are not limited to, interest packets and/or data packets in an ICN. Note that herein the term "interest packet" will be understood to be a packet that seeks content in an ICN. Herein the term "data packet" will be understood to be a packet that returns content (e.g., a content object) in an ICN in response to a request for that content.

In some embodiments, content routers modify a filter in an interest packet as it moves towards the source of a content object. Herein, this may be referred to as a "dynamic filter" as content routers may alter the filter from one hop to the next, depending on the information contained within the interest packet. The dynamic filter may be inserted into a data packet that provides the content object, wherein the content routers may use the dynamic filter to statelessly forward the data packet in a reverse path of the interest packet.

Some conventional architectures employ stateful forwarding in which the content routers have a pending interest table (PIT). State information in the PIT helps a content router identify outgoing ports for data packets (or incoming ports of the associated interest packets). The PIT may be any data structure (e.g., a table, list, or database) used to record and keep track of the received interests (requests for content) that are being served or pending (until the corresponding requested content data is received). Thus, the PIT may be used to route data packets.

The overhead associated with the PIT can be a limiting factor in achieving desired high data rates. This may especially be so in the core of an ICN. A factor in the slowdown is that large table sizes for the PIT may need to be installed on matching larger but slower memory modules. Note that a content router may need to store tens of millions of entries in the PIT at one time, which may depend on multiple factors, such as link rate, round trip times, timeout period to expire the non-responded entries. Therefore, PIT processing may slow the rate of both interest packet and data packet forwarding.

Embodiments disclosed herein avoid the use of the PIT, at least in a portion of the ICN. For example, stateless forwarding may be performed at the core of the ICN, using dynamic in-packet filters. By stateless forwarding of an interest packet it is meant that a content router forwards an interest packet in an ICN without storing state information. By stateless forwarding of a data packet it is meant that a content router forwards a data packet in an ICN without relying on saved state information. In one embodiment, a content router extracts a dynamic filter from an interest packet received on an ingress port and combines the dynamic filter with a local filter associated with the ingress port. In one embodiment, the local filter identifies the ingress port on which the interest packet was received. Optionally, the local filter could identify other information, such as the egress port on which the interest packet will be forwarded. The local filter is a bit array, in one embodiment. The packet filter is a bit array, in one embodiment. The number of bits in the local filter and packet filter might or might not be the same. The packet filter and the local filter may be combined without losing information in the packet filter or the local filter. A new filter may be inserted into the interest packet based on the combined packet filter and local filter. The interest packet having the new filter may be forwarded on an egress port. The data packet that returns the content object for the interest packet may be forwarded statelessly based on the dynamic filter. To do so, a node may extract the dynamic filter from the data packet, and determine the local filter by processing the dynamic filter. In one embodiment, the data packet is forwarded on a port identified by the local filter. This allows the data packet to flow through the network in the reverse direction as the interest packet.

Embodiments disclosed herein have a minimal of complexity. Embodiments disclosed herein are accurate in determining over which ports data packets should be forwarded. Thus, embodiments do not introduce false positives with respect to routing decisions of data packets.

FIG. 1 illustrates a network environment 100 to provide content as requested by different users in an information centric network (ICN). Herein, the term "ICN" can refer to either an information centric network or information centric networking, depending on the context. The ICN 102 may be, but is not limited to, a Named Data Network (NDN), Content Centric Network (CCN), Content Oriented Network (CON), Data Oriented Network (DON), or Content Based Network (CBN). The network environment 100 may include the ICN 102 having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISPs).

In one embodiment, the ICN is compliant with a CCN protocol. A CCN protocol emphasizes content by making it directly addressable and routable. Endpoints communicate based on named data instead of IP addresses. CCN is characterized by the basic exchange of content request messages (called "Interests") and content return messages (called "Content Objects"). The Interest message is used to request data by name. Specifically, an Interest message can identify a chunk of content to retrieve. Alternatively, an Interest message can provide a name prefix and other qualifications to restrict what data is acceptable from the collection named by the prefix. Herein, the term "interest packet" includes, but is not limited to an interest message. The Content Object is used to supply data. Herein, the term "data packet" includes, but is not limited to the message that returns a Content Object.

Communication using the CCN protocol is receiver-controlled. A Consumer of data transmits an Interest message over available connectivity and any party receiving the message and having data that matches, or satisfies, the request (according to the specifications in the Interest Message) may transmit a matching Content Object message. Data is only transmitted in response to an Interest that matches the Data. An Interest message may be transmitted using broadcast or multicast facilities of the underlying transport in order to reach many potential sources of data with minimal bandwidth cost.

ICN 102 may also include routers (or nodes) 106, which may include storage to cache content as it propagates through the ICN 102. The routers 106 may also be communicatively coupled with the ICN managers 104 and may be configured to process requests received from users for accessing the content via user devices 110, such as a mobile device or computer.

The routers 106 may collaborate for caching content with one or more other routers 106 in the network, such as an ICN, which may be configured as follows. A router 106 may comprise a content store (CS) 112, packet processing 115, local filters 120, forwarding information base (FIB) 130, and input/output (I/O) ports 135(1) to 135(n). The I/O ports are configured to receive and transmit data from/to other nodes. The CS 110 may be used (e.g., in non-transitory memory storage) to cache (for relatively short time) or store (for relatively longer time) content data. The CS 112 may also receive and associate interests (user requests for content) with corresponding content data (requested content).

The FIB 130 may be any data structure (e.g., a table, list, or database) used to associate content with corresponding ports (for next hops) on which the interests and content data are received and forwarded. The FIB 130 entries may indicate the next hops on which content (interests and data) may be forwarded. The FIB 130 may be a data structure or a sub-data structure (e.g. a data structure within a data structure), such as a table, list, or database which may be maintained and operated (to process content interest and data) at a data plane or forwarding plane. The FIB 130 may be stored in any non-transitory memory storage. The data plane may comprise operations for transferring content information (interest and data) in the CON, and the control plane may comprise operations related to controlling network operations including the data plane operations. The data structures above may be stored and maintained in a storage or memory unit of the router 106.

Note that the node 106 in FIG. 1 for which individual components are depicted does not have a PIT. At least some nodes 106 in the ICN perform stateless forwarding of packets and do not require a PIT. However, note that some nodes 106 could have a PIT, and may perform stateful forwarding. For example, some nodes 106 at the edge of the ICN 102 could perform stateful forwarding using a PIT.

The node 106 has packet processing 115 and local filters 120, which may be used to statelessly forward interest and/or data packets. Local filters 120, in one embodiment, are bit arrays. Thus, local filters 120 may be stored in any non-transitory memory storage. In one embodiment, packet processing 115 losslessly combines the bit array of a local filter with a bit array of the filter in an interest packet, as a part of generating a new filter for the next hop. Packet processing 115 may be any hardware and/or software.

The network environment 100 may further include data stores 108, which may store the content or collections of content, such as files, images, videos, and the like. Accordingly, the managers 104 and the routers 106 may communicate with the data stores 108 to provide the content to different users. Additionally, the network environment 100 may include one or more user devices 110, including for example and without limitation, desktop computers, handheld devices, laptops or other portable computers, network computers, mobile phones, landline phones, and the like.

The UE 110 may have a processor, a memory (which may or may not be non-transitory), a transceiver, and an antenna (not shown). In particular embodiments, some or all of the functionality described herein as being provided by the UE may be provided by the UE processor executing instructions stored on the memory. Alternative embodiments of the UE may include additional components that may be responsible for providing certain aspects of the UE's functionality, including any of the functionality necessary to support the embodiments of the present disclosure.

The UE 110 represents any suitable end user device and may include such devices (or may be referred to) as a user equipment/device (UE), mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device.

The information centric network 102 may include the hardware and software that provides an information centric network. In one embodiment, the information centric network 102 provides a wireless network. The information centric network 102 may include one or more computer systems. The computer system is a server, in one embodiment. The information centric network 102 may provide wireless communication to UE 110 in accordance with a wireless communication protocol. The information centric network 102 can include a collection of gateways through which wireless traffic passes. The ICN 102 may be compliant with an evolved packet core (EPC). However, the ICN 102 is not required to be EPC compliant. In one embodiment, the ICN 102 includes a Serving Gateway (Serving GW), a Packet Data Network Gateway (PDN GW), a Mobility Management Entity (MME) and a Home Subscriber Server (HSS). However, it is not required to include these elements in the ICN 102.

Although FIG. 1 illustrates one example of a communication system, various changes may be made to FIG. 1. For example, the network environment 100 could include any number of UEs 110, nodes 106, managers 104, data stores 108, or other components in any suitable configuration.

Figure 2:
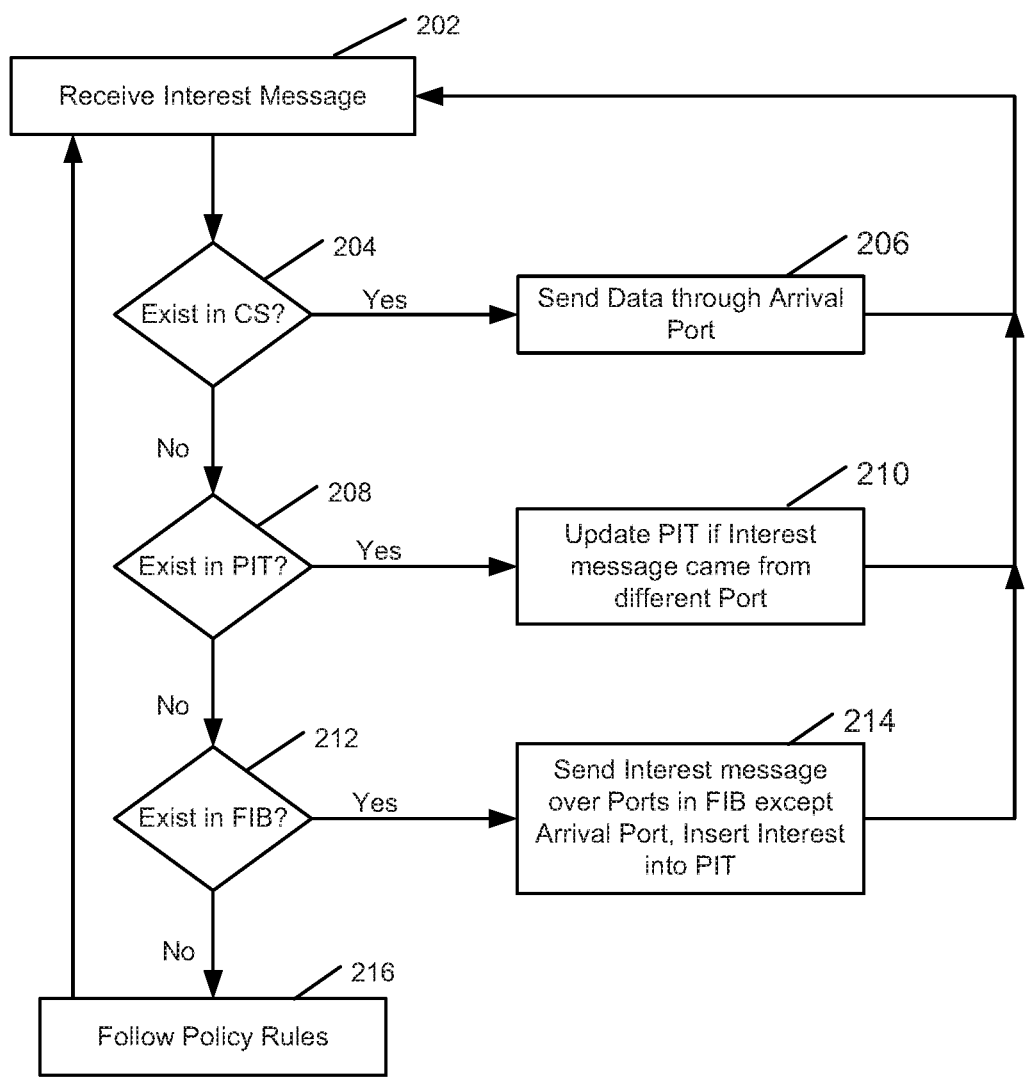
FIG. 2 shows a conventional process for handling an Interest Message by a CCN/NDN protocol.

FIG. 2 shows a conventional process 200 for handling an Interest Message by a CCN/NDN protocol. Note that this conventional protocol uses a pending interest table (PIT). A conventional router may include a PIT, in addition to a content store, FIB, and ports. Note, however, that the routers 106 in FIG. 1 are not required to have a PIT. When an Interest Message is received at step 202 on an ingress port, a lookup is performed in CS 110 at step 204. If a matching Content Object is found, it will be transmitted out of the ingress port at step 206 as a response to the Interest Message. To match, a Content Object must satisfy all of the specifications given in the Interest Message. Multiple Content Objects may simultaneously match in which case the specification in the Interest Message will be used to determine which Content Object to return. When a match is found in CS, processing stops and the Interest Message is discarded.

If there is no match at CS, a lookup is performed in the PIT at step 208. If a matching Interest Message is found in PIT, an equivalent Interest Message has already been forwarded and is pending. The ingress port of the new Interest Message is added to the list of sources of unsatisfied Interests in PIT at step 210 and the Interest Message is discarded.

If there is no match at PIT, a lookup is performed in FIB at step 212. If a matching prefix is found in FIB, an entry is created in PIT identifying the ingress port of the Interest Message and the message is transmitted according to the strategy rules to one or more of the outbound ports registered for the prefix in FIB at step 214. A PIT entry may also include the egress port or ports over which the Interest is forwarded.

If no match is found in the previous steps, then the node has no way to satisfy the Interest Message at present. Policy rules may be followed at step 216 to handle this situation. The Interest Message may be held for a short time before being discarded, and the creation of a new FIB 130 entry at step 206 may provide a way to satisfy the Interest Message. As shown above, CCN content names are not interpreted in the operation of the CCN protocol itself, just matched. All assignment of meaning to names or their component parts comes from the application, institution, and/or global conventions reflected in prefix forwarding rules.

Figure 3:
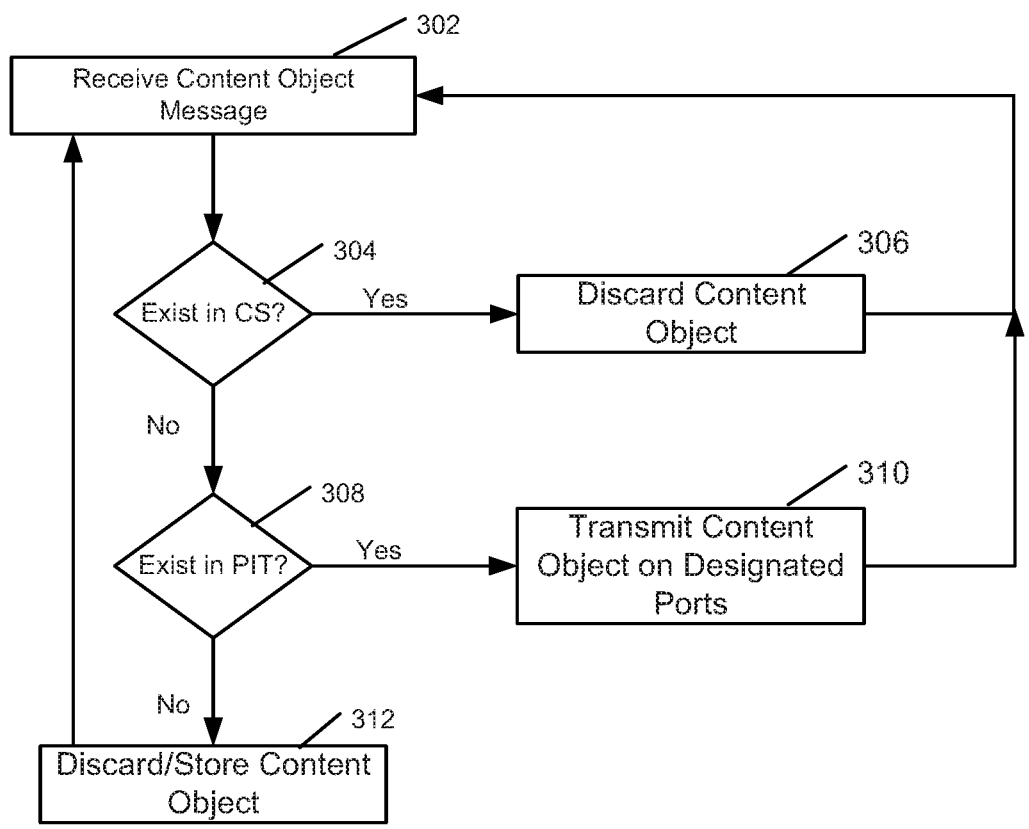
FIG. 3 shows a conventional process for handling Content Object messages by a CCN/NDN protocol.

FIG. 3 shows a conventional process 300 for handling Content Object messages by a CCN/NDN protocol. The process 300 may be used in combination with the conventional process 200 of processing an Interest Message shown in FIG. 2. A Content Object message is received at step 302. A lookup is performed in CS at step 304. If a matching Content Object is found it means that the newly arrived Content Object is a duplicate which can safely be discarded at step 306, because any Interest Messages have already been satisfied and new ones will be satisfied out of CS.

If there is no match at CS, a lookup is performed in PIT at step 308. If there is a match in PIT, the Content Object is transmitted at step 310 on all of the source ports for the Interests represented in PIT. A node may perform verification of the Content Object before forwarding it and may apply various policy restrictions. The content Object is then cached at CS.

If no match is found in PIT, then the content is unsolicited. A node does not forward unsolicited data. At step 312, the unsolicited data may be discarded or may be stored in CS in case it is subsequently requested.

Figure 4:
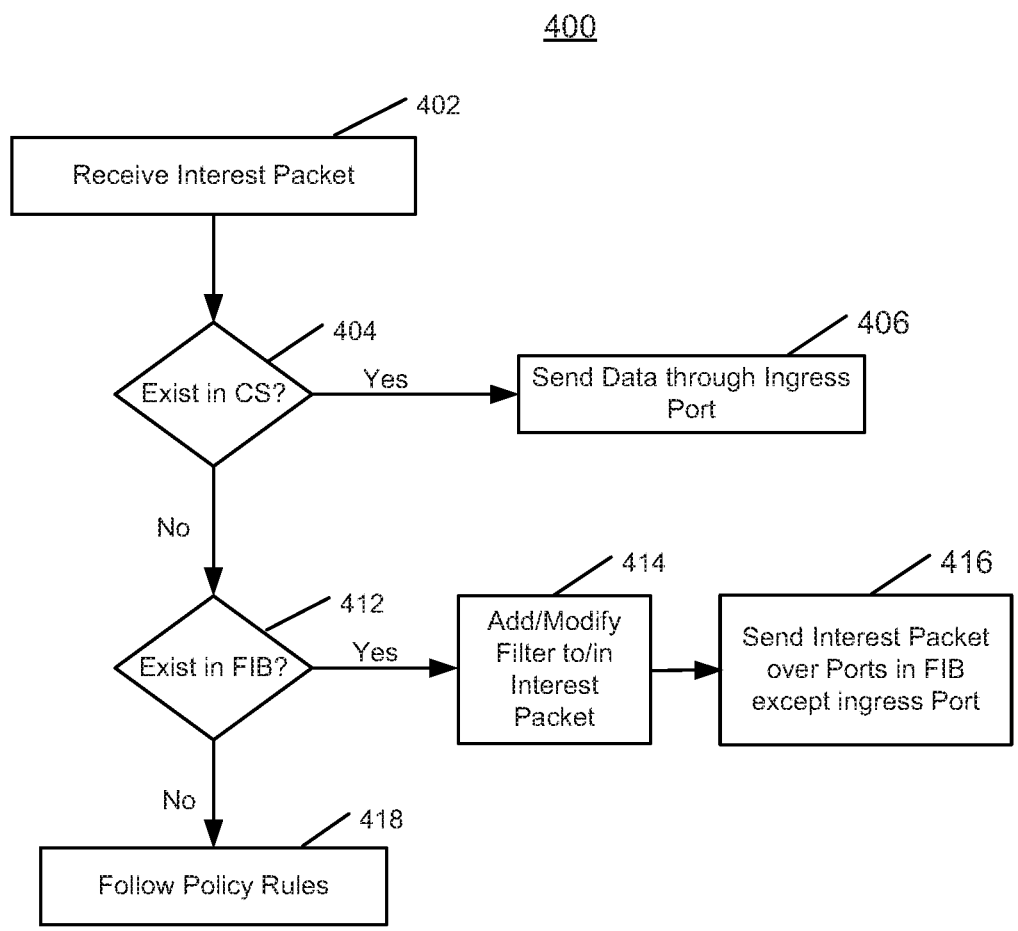
FIG. 4 is a flowchart of one embodiment of a process for handling an Interest Message.

FIG. 4 is a flowchart of one embodiment of a process 400 for handling an Interest Message. The Interest Message may be transmitted as a packet, and hence may be referred to as an "Interest Packet". The Interest Message is compliant with an ICN protocol, in one embodiment. The process 400 may be used in a CCN, but is not limited to CCN. In one embodiment, the Interest Packet is compliant with an NDN packet format specification. However, the Interest Packet is not required to be compliant with an NDN packet format specification.

Note that process 400 does not require use of a pending interest table (PIT). Instead stateless forwarding of interest messages (e.g., ICN interest messages) may be used. Process 400 may be practiced in the environment 100 of FIG. 1, but is not limited thereto. The process 400 may be performed by various elements (e.g., routers 106) in FIG. 1, but is not limited to that example network environment 100. For example, a single router 106 may perform all of the steps in process 400. Note that multiple routers 106 may perform the process 400 to route the Interest Message in a stateless manner. By a stateless manner, it is meant that the node does not save state information about the Interest Message.

When an Interest Packet is received at step 402 on an ingress (otherwise referred to as arrival or inbound) port 135, a lookup is performed in CS 112 at step 404. If a matching Content Object is found, it may be transmitted out of the ingress port at step 406 as a response to the Interest Message. Multiple Content Objects may match, in which case the specification in the Interest Packet may be used to determine which Content Object to return. When a match is found in CS 112, processing stops and the Interest Packet is discarded.

If there is no match at CS 112, a lookup may be performed in FIB 130 at step 412. If a matching prefix is found in FIB 130, a filter may either added to the interest packet or an existing filter in the interest packet may be modified, in step 414. That is, if there is not already an existing filter in the interest packet, then one may be created and added thereto. If the interest packet already has a filter, then that filter may be modified, in step 414. Either adding the new filter or modifying the existing filter are examples of inserting a new filter into the interest packet. In some embodiments, an interest packet may be generated based on the received interest packet inserted with the new filter.

In step 416, the Interest Packet is transmitted according to the strategy rules to one or more of the egress ports 135 registered for the prefix in FIB 130 at step 412.

If no match is found in the previous steps, then the node has no way to satisfy the Interest Packet at present. Policy rules may be followed at step 418 to handle this situation. The Interest Packet may be held for a short time before being discarded, and the creation of a new FIB 130 entry at step 418 may provide a way to satisfy the Interest Message.

Figure 5B:
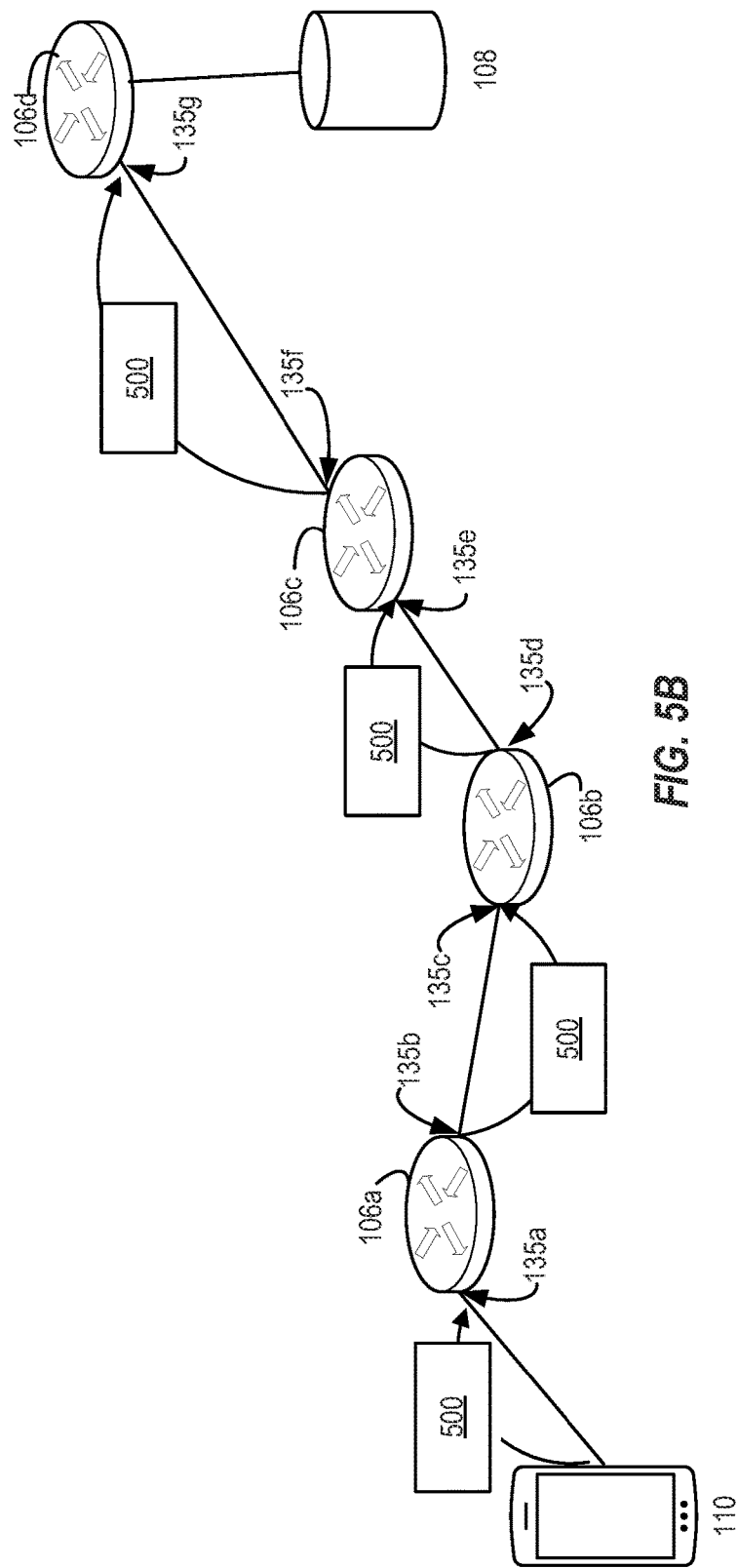
FIG. 5B depicts a flow of an interest packet, in accordance with one embodiment.
Figure 5A:
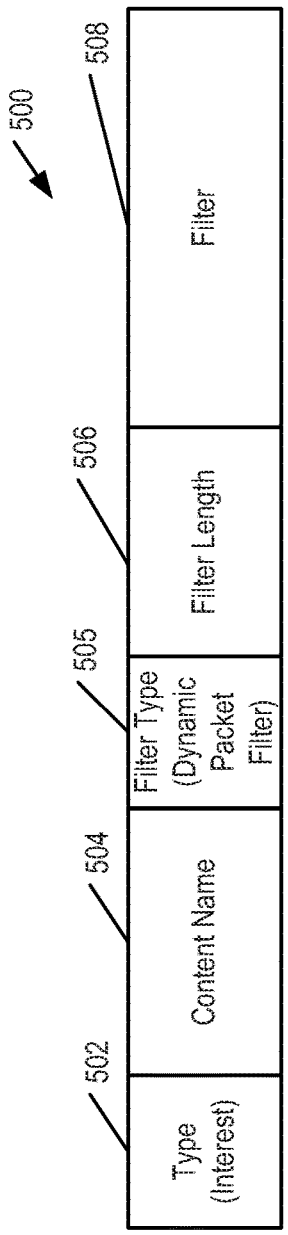
FIG. 5A depicts of a portion of one embodiment an interest packet.

FIG. 5A depicts of a portion of an interest packet 500 in one embodiment. The interest packet 500 includes a type field 502, which in this case is "Interest" to indicate that this is for an interest packet. Note that this field 502 could be "Content Object" if the packet were instead a data packet. The content name 504 is the name of the content object being sought. The filter type field 505 is set to "Dynamic Packet Filter" to indicate that there is a dynamic filter in the interest packet 500. The length field 506 defines the length of the dynamic filter. The filter field 508 may contain a dynamic filter that may be used to control stateless forwarding of the interest packet 500. The dynamic filter may also be referred to as a "packet filter".

FIG. 5B depicts a flow of an interest packet 500, in accordance with one embodiment. The flow is simplified for ease of illustration. There may be more nodes 106 along the path that process the interest packet 500. The flow provides details for one embodiment of steps 414 and 416 of FIG. 4. The UE 110 sends an interest packet 500, which is received by node 106a at port 135a. Note that the filter field 508 may be empty when the UE 110 sends the interest packet 500.

Node 106a adds a filter to the filter field 508 in the interest packet 500 and forwards the interest packet out port 135b. The interest packet 500 from node 106a is received by node 106b on port 135c. Adding the filter to the interest packet is one embodiment of step 414. Forwarding the interest packet is one embodiment of step 416.

Node 106b extracts the filter from the interest packet 500, modifies the filter, inserts the modified filter into the interest packet 500, and forwards the interest packet on port 135d. Modifying the filter in the interest packet is one embodiment of step 414. Forwarding the interest packet is one embodiment of step 416.

The interest packet from node 106b is received by node 106c on port 135e. In one embodiment, stateless forwarding is performed all the way to the producer of the content. In FIG. 5B, node 106d is the producer. The following describes one such embodiment. In one embodiment, node 106c extracts the filter from the interest packet 500, modifies the filter, inserts the modified filter to the interest packet, and forwards the interest packet on port 135f. Extracting and modifying the filter in the interest packet is one embodiment of step 414. Forwarding the interest packet is one embodiment of step 416.

The interest packet 500 reaches node 106d that has access to a database 108 that stores an object to satisfy the interest message 500. Note that there may be other nodes between node 106c and node 106d. Node 106d accesses the content object that satisfies the interest from data store 108, and generates a data packet that contains the content object. In one embodiment, node 106d extracts the filter from the interest packet 500 and inserts that filter into the data packet.

In one embodiment, stateless forwarding does not go all the way to the producer (e.g., node 106d). In this case, some other node 106 is the end of the line for stateless forwarding. For example, node 106c may be the last node that processes the filter in the interest packet 500. In this case, node 106c may extract the filter from the interest packet that it received on port 135e and store that filter. That filter may be inserted into a data packet that satisfies the interest. This will be discussed in more detail below.

Also note that there may be one more other nodes 106 that do not perform stateless forwarding. For example, there may be one or mode nodes 106 between UE 110 and node 106a ("edge nodes) that perform stateful forwarding using a PIT.

Figure 6:
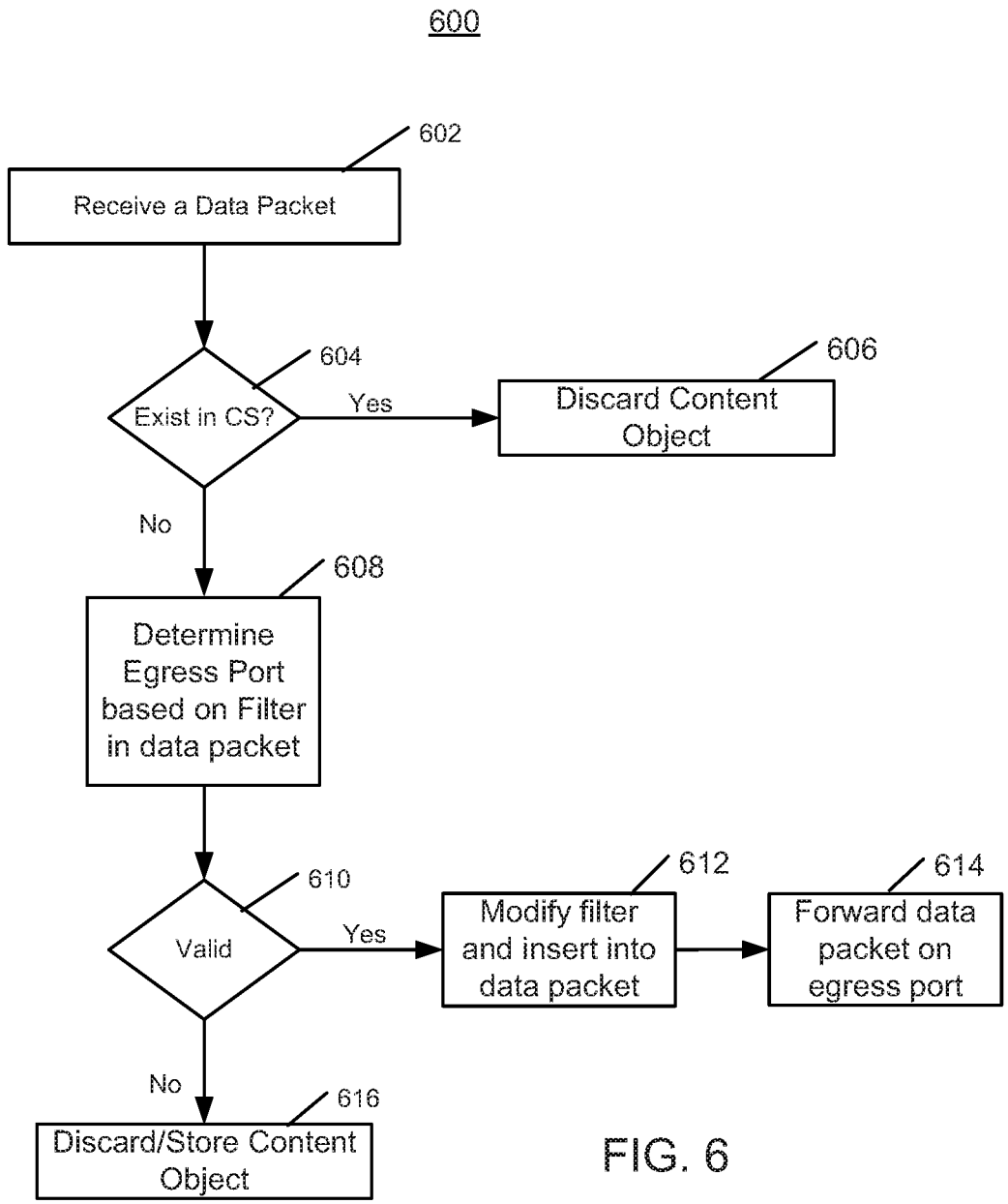
FIG. 6 is a flowchart of one embodiment of a process of data packet processing.

Thus, after the interest packet 500 reaches node 106d, a data packet may be returned. FIG. 6 is a flowchart of one embodiment of a process 600 of data packet processing. The process 600 may be used in combination with one embodiment of the process 400 of processing an Interest Packet shown in FIG. 4. The flow of process 600 assumes that there is a dynamic filter in the data packet that is received by a node 106. In one embodiment, the producer node (e.g., node 106d in FIG. 5B) put a filter in the data packet when the packet was first formed. In another embodiment, a node 106 somewhere on the path back to the UE 110 put the dynamic filter in the data packet. For example, node 106c may be the node the initially places the filter in the data packet.

In one embodiment, the process 600 is compliant with a CCN/NDN protocol. The process 600 is not required to be complaint with a CCN/NDN protocol. The process 600 could be compliant with another ICN protocol. The process 600 is not required to be compliant with any specific ICN protocol. Process 600 may be performed in the environment of FIG. 1, but is not so limited.

A data packet is received by a node 106 at step 602. In one embodiment, this is a content object message. A lookup is performed in CS at step 604. If a matching Content Object is found it means that the newly arrived Content Object is a duplicate which can safely be discarded at step 606, because any Interest Messages have already been satisfied and new ones will be satisfied out of CS.

If there is no match at CS, the node 106 determines an egress port based on a dynamic filter in the data packet. The egress port refers to a port that the data packet should be forwarded on. Step 608 may determine one or more egress ports.

Step 610 includes a test to determine whether the egress port(s) is valid. If so, the process 600 continues at step 612. In step 612, the node modifies the filter that was extracted from the data packet. These modifications may be the inverse of modifications performed by this node when it processed an interest message associated with this data packet. The modified filter is then inserted into the data packet. The data packet is forwarded on the egress port(s), in step 614 the Content Object in the data packet may be cached in the CS. In one embodiment, the dynamic filter in an interest message tends to grow in size as it is forwarded, and the dynamic filter in a data message tends to shrink in size as it is forwarded.

If the node determined that the egress port was not valid, then the data packet is discarded in step 616. This may be a result of the data packet being unsolicited. In one embodiment, a node does not forward unsolicited data packets. At step 616, the unsolicited content object may be discarded or may be stored in the CS in case it is subsequently requested.

Figure 7B:
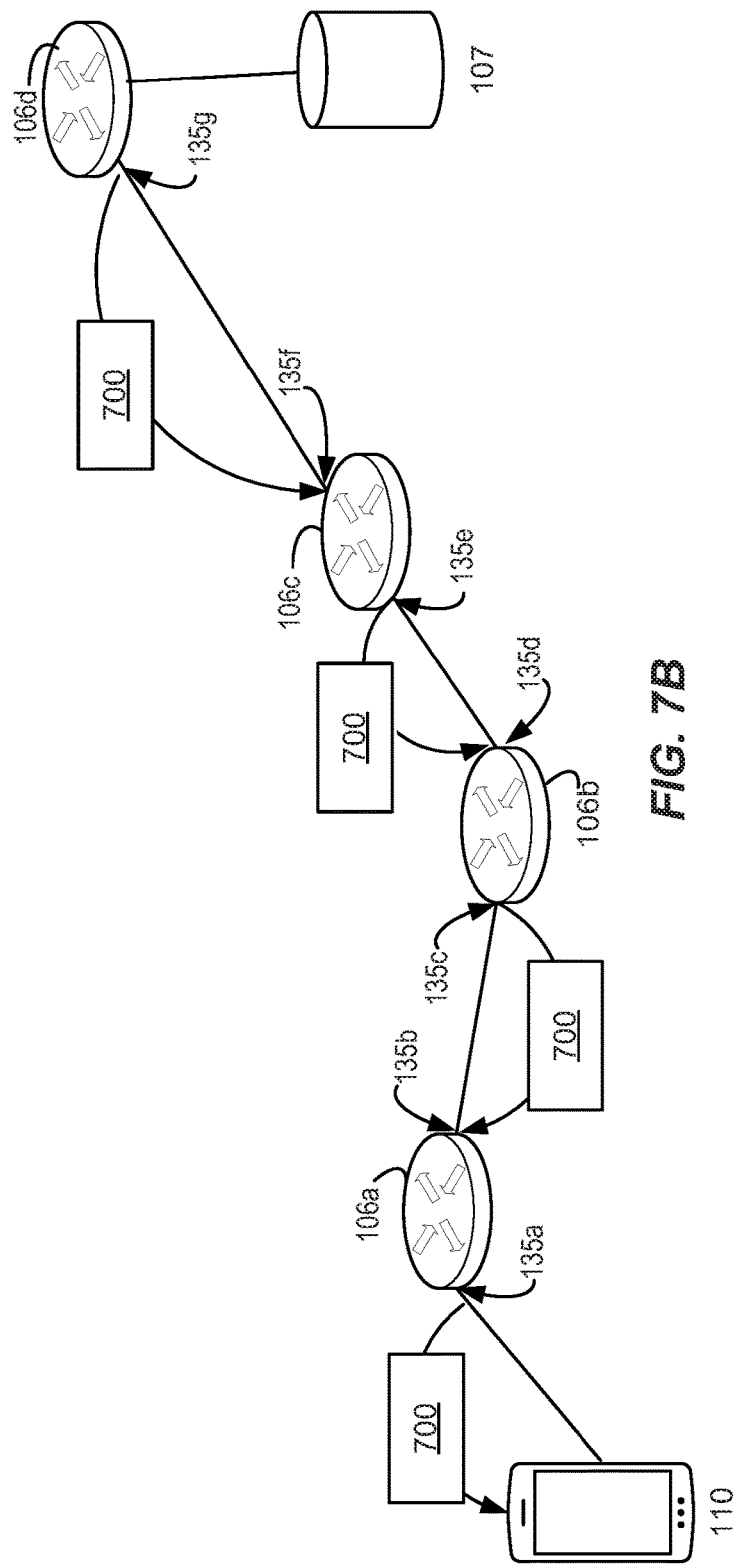
FIG. 7B depicts a flow of a data packet, in accordance with one embodiment.
Figure 7A:
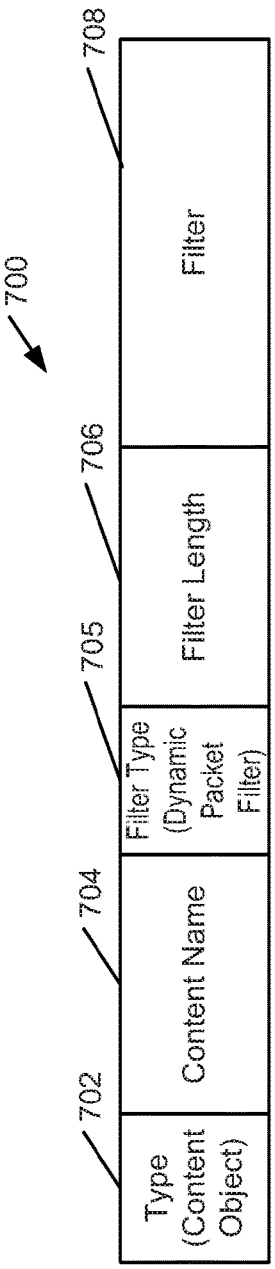
FIG. 7A depicts one embodiment of a portion of a data packet.

FIG. 7A depicts one embodiment of a portion of a data packet 700. The data packet has a type field 702, which in this case is "Content Object", to indicate that the packet contains a content object. Note that were this an interest packet, then this field 702 may be "Interest." The content name field 704 contains the name of the content object. The filter type field 705 may be used to indicate that there is a dynamic packet filter in the data packet 700. The filter length field 706 defines the length of the dynamic filter. The filter field 708 may contain a dynamic filter. The dynamic filter may be used for stateless forwarding of the data packet 700. The dynamic filter may also be referred to as a "packet filter".

FIG. 7B depicts a flow of a data packet 700, in accordance with one embodiment. The data packet 700 may return in the reverse flow as the interest packet 500. The nodes 106 are the same as those depicted in FIG. 5B. Node 106d forms a data packet 700 that contains a content object to satisfy the content name in the interest packet 500. In one embodiment, node 106d puts the dynamic filter from the corresponding interest message 500 into the data packet 700.

Node 106c receives a data packet 700 from the node 106d at port 135f. As noted above, there may be other nodes between the node 106d and node 106c. In one embodiment, node 106c extracts the dynamic filter from the data packet 700 and determines what port the data packet should be forwarded on based on the extracted filter. In this example, node 106c determines that the data packet 700 should be forwarded on port 135e. Node 106c is able to do so without use of a PIT. The foregoing is one embodiment of step 608. Node 106c may also modify the filter in the data packet 700. This one embodiment of step 612. Node 106c forwards the data packet 700 on port 135e. This is one embodiment of step 614 of FIG. 6.

As noted, in one embodiment, node 106c is the first node to process a filter in the data packet. In this embodiment, the data packet 700 does not contain a dynamic filter when the data packet is received by node 106c. However, node 106c has a stored copy of the dynamic filter from a corresponding interest packet. A "corresponding interest packet" may be one that requested the content object that is being returned by the data packet. Node 106c may determine the port on which the data packet 700 should be forwarded based on that stored filter. Node 106c inserts that filter into the data packet 700, and forwards the data packet on port 135e.

Node 106b receives the data packet 700 from node 106c on port 135d. Node 106b extracts the filter from the data packet 700 and determines what port the data packet should be forwarded on based on the extracted filter. In this example, node 106b determines that the data packet 700 should be forwarded on port 135c. Node 106b is able to do so without use of a PIT. The foregoing is one embodiment of step 608. Node 106b may also modify the filter in the data packet 700. The modifying is one embodiment of step 612. Node 106b forwards the data packet 700 on port 135c. The forwarding is one embodiment of step 614 of FIG. 6.

Node 106a receives the data packet from node 106b on port 135b. Node 106a extracts the filter from the data packet 700 and determines what port the data packet should be forwarded on based on the extracted filter. In this example, node 106a determines that the data packet 700 should be forwarded on port 135a. Node 106a is able to do so without use of a PIT. The foregoing is one embodiment of step 608. Node 106a may also modify the filter in the data packet 700. The modifying is one embodiment of step 612. Node 106a forwards the data packet 700 on port 135a. The forwarding is one embodiment of step 614 of FIG. 6.

The UE 110 receives the data packet 700 that was forwarded by node 106a. There may be one or more nodes 106 between node 106a and the UE 110. Note that those nodes (e.g., edge nodes) might or might not use stateless forwarding using the dynamic filter. Some of the nodes (e.g., edge nodes) could forward the data packet 700 using a PIT.

FIG. 8 is a flowchart of one embodiment of a process 800 of interest packet processing. The process 800 may be used in one embodiment of step 414 of process 400. The process 800 describes adding a filter to an interest packet that does not presently have a dynamic filter. This is one way to insert a new dynamic filter into an interest packet. With respect to the example of FIG. 5B, process 800 may be performed by node 106a. In one embodiment, a node 106 examines an interest packet to determine whether a dynamic filter exists in the interest packet. If not, then the node 106 performs process 800 to add a filter, as opposed to modifying an existing dynamic filter.

In step 802, the node 106 accesses a local filter that is based, at least in part, on the port on which the interest packet was received. Herein, this may be referred to as an ingress port. As one simple example, if the node 106 has eight ports 135, then each ingress port can be represented as a three bit value. Hence, the local filter can be defined as a three bit value in this simple example. For the sake of discussion, these eight ingress ports will be referred to as port 0 through port 7. For example, ingress port 0 can be assigned [000], ingress port 1 can be assigned [001], etc. For the sake of discussion, the local filter may be defined as a bit array [b].

In one embodiment, the local filter is also based on the port on which the interest packet is to be forwarded. Herein, this may be referred to as an egress port. As a simple example, the local filter is formed by concatenating the bits for the ingress port and the egress port. Continuing with the example of eight ports (each of which might be an ingress port and/or an egress port), there are 64 possible combinations of an ingress and an egress port. For example, the combination of port 0 being both the ingress and the egress port may be [000000], the combination of port 0 being the ingress port and port 1 being the egress port may be [000001], etc.

In some embodiments, the local filter is modified prior to inserting it into the interest packet. This modification can provide for additional security. Optional step 804 modifies the local filter in some manner. FIGS. 9A, 9B and 9C are flowcharts of embodiments of processes for modifying the local filter.

Step 806 includes inserting the local filter (possibly modified) into the interest packet. For example, the local filter is inserted into the filter field 508.

FIG. 9A is a flowchart of one embodiment of a process 804a of modifying a local filter. This is one embodiment of step 804 from FIG. 8. In step 902, the content name from the interest packet is transformed in some manner. In one embodiment, the content name is hashed. Hashing the content named is convenient as it can generate a request dependent filter. Thus, interest packets (with different content requests) going over the same path may have different filters. An alternative is to use some other information in the interest packet than the content name.

Note that the hash function of the different nodes may be, but is not required to be, different from each other. This helps to create non-shared randomness in the filters created by different routers. This randomness helps to provide security when the router later processes a data packet.

Also, hashing is just one example of the transform operation. In one embodiment, the content name (or other information in the interest packet) is converted to a bit array. Then, for example, a cyclic redundancy check (CRC) (or something similar to a CRC) may be used on the bit array.

Each router may use different parameters for the CRC. Thus, as with using different hash function, each node 106 may produce a unique result.

Thus, in one embodiment, step 902 transforms some information in the interest packet in a way that provides a unique result for each router. Note that it is not required that each router is guaranteed to produce a unique result.

In step 904, the transformed content name is combined with the local filter. In one embodiment, an XOR is performed between the transformed (e.g., hashed) content name and the local filter. Note that the transformed content name may be shortened or lengthened such that it has the same number of bits as the local filter.

FIG. 9B is a flowchart of one embodiment of a process 804b of modifying a local filter. This is one embodiment of step 804 from FIG. 8. In step 912, a key is added to the local filter. For example, the key may be "k" bits that are added to the local bit array [b]. As one example, the k bits could be appended to one end of the bit array [b]. The key may help to provide security. As will be described below, the node 106 that inserts this key can test for the key in a data packet. If the key is not found, the data packet can be dropped. Thus, the key can help to avoid forwarding a data packet that should not be forwarded. As one example, the key identifies the egress port. For example, a different key could be used for each egress port. However, the key is not required to identify the egress port. Also, it is not required that a different key be used for each egress port.

FIG. 9C is a flowchart of one embodiment of a process 804c of modifying a local filter. This is one embodiment of step 804 from FIG. 8. In step 922, a signature is added at a specific locations in the local filter. For example, consider that bit array [b] is defined as [11010101]. As one example, six bits can be inserted at specific locations in the bit array [b]. The x's indicate the locations [110xx101xx01xx], as one example. Thus, the pattern of "x" s represent the signature. Each bit in the string of x's are "0", in one embodiment. Each bit in the string of x's are "1", in one embodiment. Many different patterns could be used, dependent on or independent of the information carried within the request, such as the content name. The x's may serve as validation bits. As will be described below, the router that inserts these bits can test for them in a data packet. If the bits do not match, the data packet can be dropped. The bits can be used as a way of verifying the router's identify. Thus, the signature can help to avoid forwarding a data packet that should not be forwarded. In one embodiment, each node 106 has a unique signature. However, it is not required that each router's signature be unique to provide additional security.

Note that process 804a may be combined with process 804b. For example, step 912 may be performed prior to step 904. Thus, step 904 may combine the transformed content name with the local filter with the key added.

Note that process 804a may be combined with process 804c. For example, step 922 may be performed prior to step 904. Thus, step 904 may combine the transformed content name with the local filter with the signature added.

FIG. 10 is a flowchart of one embodiment of a process 1000 of interest packet processing. The process 1000 may be used in one embodiment of step 414 of process 400. One way in which process 1000 differs from process 800, is that the node 106 extracts a filter from the interest packet 500. With reference to FIG. 5B, process 1000 might be performed by node 106b or 106c, but is not limited thereto. Note that process 800 may be used by node 106a in FIG. 5B. Thus, process 800 and process 1000 may be used to process the same interest packet 500, but by different nodes.

In step 1002, the node 106 extracts a filter from the interest packet 500.

In step 1004, the node 106 accesses a local filter that is based, at least in part, on the port 135 on which the interest packet 500 was received. This step may be similar to step 802, and hence will not be described in detail. Thus, the discussion and examples of step 802 apply to one embodiment of step 1004.

In step 1006, the node 106 combines the extracted filter with the local filter in a lossless manner. Combining the extracted filter with the local filter in a lossless manner means that information in the extracted filter is not lost and that also information in the local filter is not lost as a result of combining the extracted filter with the local filter. Therefore, the original information in both the local filter and the extracted filter could be recovered by performing the inverse of the combining operation. This recovery operation might occur when processing a data packet that has a dynamic filter based on the combined local filter and extracted filter. Note that if the local filter identifies a port on which an interest packet was received by this node 106, this allows the port to be positively identified during processing of a data packet that has a dynamic filter based on the combined local filter and extracted filter. Note that the extracted filter may identify ports of other nodes that received the interest packet. For example, the extracted filter may identify ingress ports on which other nodes received the interest packet. Hence, by not losing information in the extracted filter, ports of other nodes may be positively identified by those nodes (when processing a data packet having a dynamic filter based on the extracted filter). One example of combining the extracted filter with the local filter in a lossless manner is to concatenate the extracted filter with the local filter. For example, if the extracted filter is three bits long and the local filter is three bits, then the combination may result in six bits. Thus, the extracted filter may be defined by a bit array [a], and the local filter may be defined by a bit array [b], with the combination (bit array [c]) being defined as [a] [b]. For example, the "m" bits of array [a] may be followed by the "n" bits of array [b]. Note that, in this example, all "m" and all "n" bits are included in bit array [c].

The filters can be combined in a lossless manner using a technique other than concatenation. For example, the bits in bit array [c] can alternate between one bit from bit array [a] and one bit from bit array [b]. Other techniques may be used to combine the extracted filter with the local filter in a lossless manner. Note that combining the extracted filter with the local filter in a lossless manner may eliminate false positives. In this context, a false positive means that when processing a data packet, a data packet may be forwarded on a port that it should not have been forwarded on.

In some embodiments, the bit array [c] is modified prior to inserting it into the interest packet. This modification can provide for additional security. Optional step 1008 modifies the local filter in some manner. Step 1008 may be similar to optional step 804 from process 800. FIG. 10A is a flowchart of one embodiment of step 1008 of process 1000. FIG. 10A is similar to FIG. 9A, but operates on the combined extracted and local filters. Step 1020 may be similar to step 902. In step 1022 rather than operating on the local filter, bit array [c] may be used. Thus, in step 1022, the transformed (e.g., hashed) content named may be combined (e.g., XORed) with bit array [c]. Note that other information in the interest packet than the content name might be used.

FIG. 10B is a flowchart of one embodiment of step 1008 of process 1000. In step 1030, a "k" bit key is added to bit array [c]. Note that the key could be added to the local filter either prior to or after step 1022. For example, several bits may be added to bit array [b] prior to forming bit array [c]. Thus, process 804b (see FIG. 9B) may be used in one embodiment of step 1008.

FIG. 10C is a flowchart of one embodiment of a process 1008c of modifying the combined filters. This is one embodiment of step 1008 from FIG. 10. In step 1040, a signature is added at specific locations in the combined filters (e.g., bit array [c]). For example, consider that bit array [c] is defined as [11010101]. As one example, six bits can be inserted at specific locations in the bit array [c]. The x's indicate the locations [110xx101xx01xx], as one example. Each bit in the string of x's are "0", in one embodiment. Each bit in the string of x's are "1", in one embodiment. Many different patterns could be used. This example is similar to process 804c, which operates on the bit array [b] for the local filter. One option is to use process 804c in step 1008.

Step 1010 includes inserting the local filter (possibly modified as in step 1008) into the interest packet. For example, the bit array [c] (possibly modified per step 1008) may be inserted into the filter field 508 of the interest packet 500.

Figure 11:
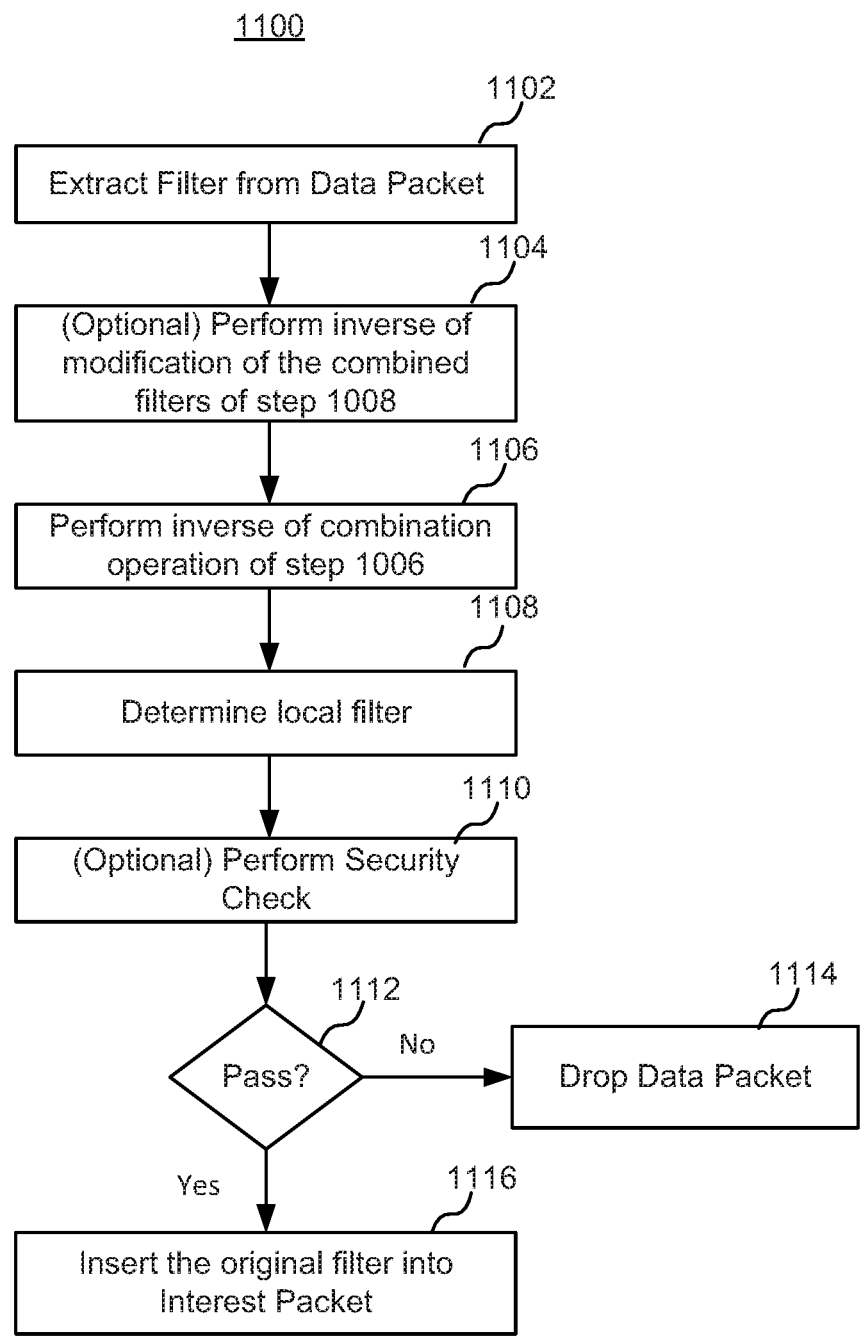
FIG. 11 is flowchart of one embodiment of a process of data packet processing.

FIG. 11 is flowchart of one embodiment of a process 1100 of data packet processing. The process 1100 is used in combination with process 1000, in one embodiment, but is not limited to use with process 1000. For example, process 1000 may be used to insert dynamic filters into interest packets, and process 1100 may be used to process data packets that are returned by a content node in response to the interest packets. In one embodiment, the same nodes that perform process 1000 also perform process 1100. In step 1102, the node extracts the dynamic filter from the data packet 700. In some embodiments, the dynamic filter should be in the same state as when this node inserted the filter into a corresponding interest packet.

Figure 11A:
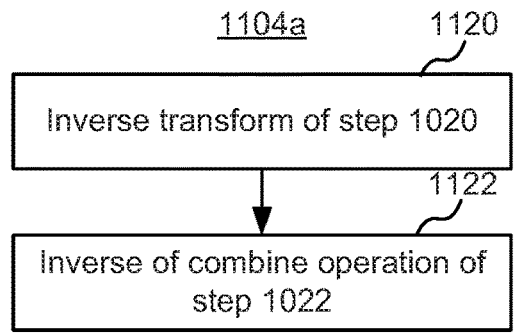
FIG. 11A is a flowchart of one embodiment of a process of performing an inverse of operations performed on an interest packet.

In optional step 1104, the node performs the inverse of the modification of the combined filter of step 1008. Conceptually, at least some of the processing of the filter in the data packet may be the inverse of processing of the filter in the interest packet. Recall that step 1008 indicates that various modifications can be performed on the combined filters. FIG. 11A describes one embodiment of step 1104.

Step 1106 includes performing the inverse of the combining operation of step 1006. Recall that step 1106 losslessly combined the filter from the interest packet with the local filter. In one embodiment, this operation combined bit array [a] and bit array [b] to produce bit array [c]. Thus, step 1106 may generate bit array [a] and bit array [b] from bit array [c]. Note that bit array [c] might be extracted directly from the data packet or derived from the dynamic filter therein. For example, step 1104 may derive bit array [c] from the dynamic filter in the data packet.

Step 1108 includes determining the local filter. In one embodiment, the local filter is bit array [b]. Step 1108 may also include determining the egress port based on the local filter. In other words, the node 106 may determine what port the data packet should be forwarded on, based on the local filter. This may be based on a mapping of local filters to ports. An example mapping was discussed with respect to step 802.

Figure 11B:
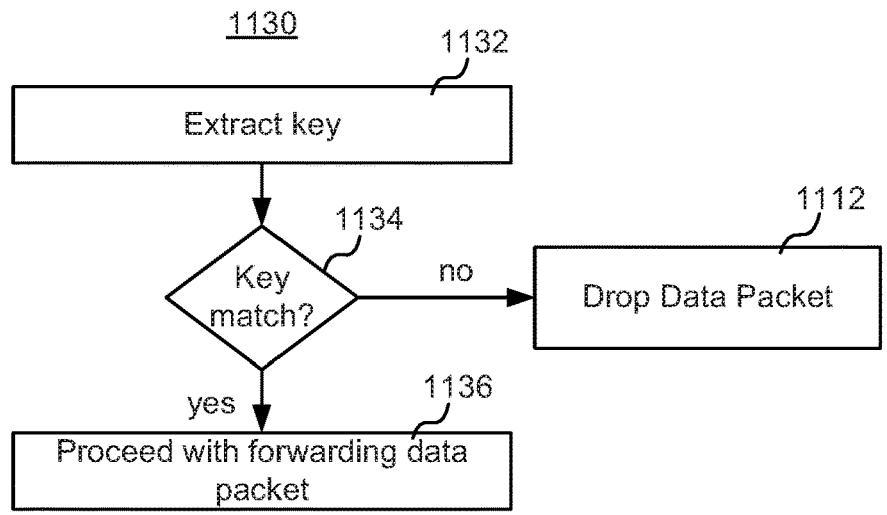
FIG. 11B is a flowchart of one embodiment of a process of performing a security check.
Figure 11C:
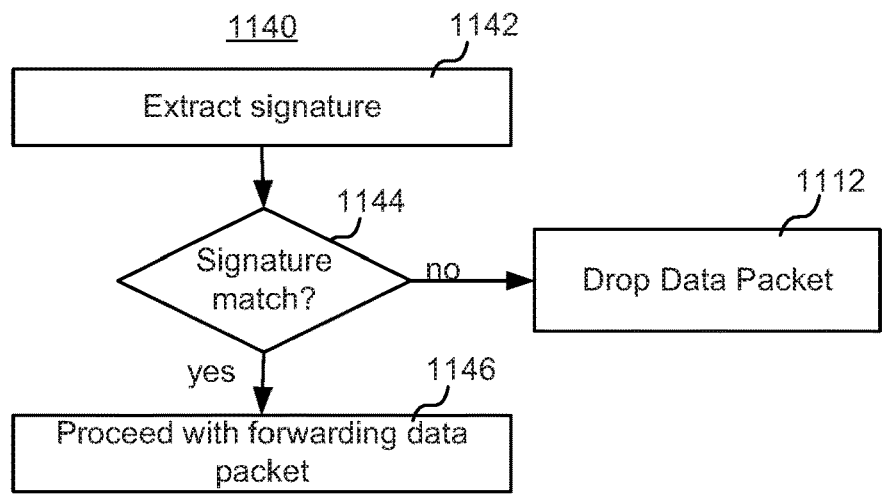
FIG. 11C is a flowchart of one embodiment of a process of performing a security check.
Figure 11D:
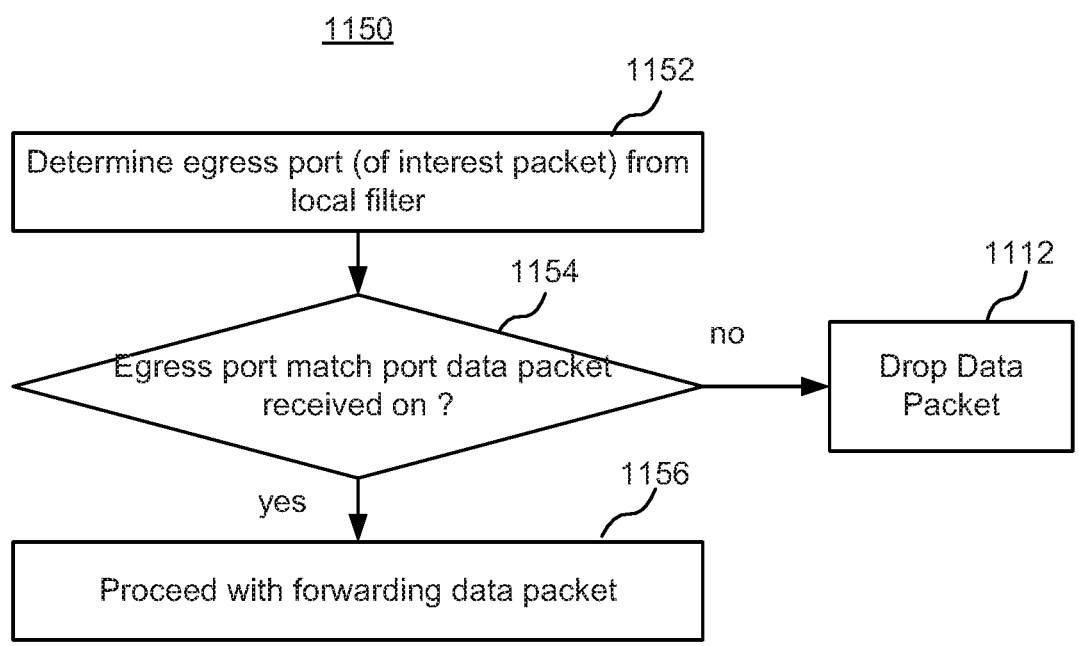
FIG. 11D is a flowchart of one embodiment of a process of performing a security check.

Step 1110 is an optional security check. Step 1110 may include determining whether the data packet should be forwarded on the egress port. FIGS. 11B-11D are embodiments of security checks. If the security check(s) does not pass, then the data packet is dropped in step 1114. Otherwise, the process 1100 continues at step 1116.

In step 1116, the node inserts the original filter from the interest packet it received into the data packet. For example, node is able to determine both the local filter (e.g., bit array [b]) and the original filter from the interest packet (e.g., bit array [a]) from bit array [c]. In some embodiments node inserts bit array [a] into the filter field of the data packet. Thus, in some embodiments, the filter is in the same state as the filter was in when the node received the corresponding interest packet. Thus, when the data packet is received by the node at the next hop, the filter may be in the same state as when the node put the filter into the interest packet.

FIG. 11A is a flowchart of one embodiment of a process 1104a of performing an inverse of operations performed on an interest packet. This is one embodiment of step 1104 of process 1100. In step 1120, the node performs an inverse of the transform operation of step 1020 of process 1008a. In step 1122, the node performs an inverse of the combine of step 1022 of process 1008a.

For example, the process may begin with the filter extracted from the filter field of the data packet. Assuming that the content name in the interest packet was hashed, then the content name in the data packet is hashed (using the same hash function). Assuming an XOR was performed in step 1022, an XOR may again be performed. This time the hashed content name is XORed with the filter from the data packet. The result is the bit array [c], in one embodiment. Since the node knows the length of local filter (e.g., bit array [b]), the node can determine both the local filter (e.g., bit array [b]) and the dynamic filter from the received interest packet (e.g., bit array [a]).

FIG. 11B is a flowchart of one embodiment of a process 1130 of performing a security check. This is one embodiment of steps 1110-1114 of process 1100. In one embodiment, this process is used in combination with process 1008b of FIG. 10B. Recall that a key was added to, for example, bit array [c] in that process. In step 1132, the node extracts a key. This may be extracted from bit array [c], which may be determined earlier in process 1100.

In step 1134, the node determines whether the key matches with an expected key. Whether two keys match may be determined based on a result of a comparison operation on these keys. For the extracted key to match the expected key the value of the extracted key should be the same as the value of the expected key. In one embodiment, the key is expected to match the port over which the data packet is received. Thus, note that in process 1008b, the node would have added a key that matched the egress port. If the key does not match the process 1008b the port over which the data packet is received, then the data packet is dropped, in step 112. Otherwise, processing of the data packet continues in step 1136.

FIG. 11C is a flowchart of one embodiment of a process 1140 of performing a security check. This is one embodiment of steps 1110-1114 of process 1100. In one embodiment, this process is used in combination with process 1008c of FIG. 10C. Recall that a signature was added to, for example, bit array [c] in that process. In step 1142, the node extracts a signature. This may be extracted from bit array [c], which may be determined earlier in process 1100.

In step 1144, the node determines whether the signature matches an expected signature. For the signatures to match, they should be identical. Recall that the signature may be defined by certain bit values (e.g., "0" or "1") at certain locations in a bit array. For the signatures to match, the extracted array should have the correct bit values (e.g., "0" or "1") at the certain locations. In one embodiment, the signature is expected to match the signature of this node 106.

Thus, note that in process 1008b, the node would have added a signature that was specific to this node. It is not required that the signature be unique with respect to all other nodes in order to increase the level of security. If the signature does not match, then the data packet is dropped, in step 1112. Otherwise, processing of the data packet continues in step 1146.

FIG. 11D is a flowchart of one embodiment of a process 1150 of performing a security check. This is one embodiment of steps 1110-1114 of process 1100. In one embodiment, this process is used in combination with the node basing the local filter on both the ingress port and the egress port of the interest packet.

In step 1152, the node 106 determines the egress port of the interest packet from the local filter. For example, first the node determines the bit array [b], as discussed with respect to process 1100. The node 106 may determine both the egress port for the data packet and the egress port of the corresponding interest packet from bit array [b].

If the egress port of the corresponding interest packet matches the port in which the data packet was received, then processing continues at step 1156. If the egress port of the corresponding interest packet does not match the port in which the data packet was received, then the data packet is dropped in step 1112.

Figure 12:
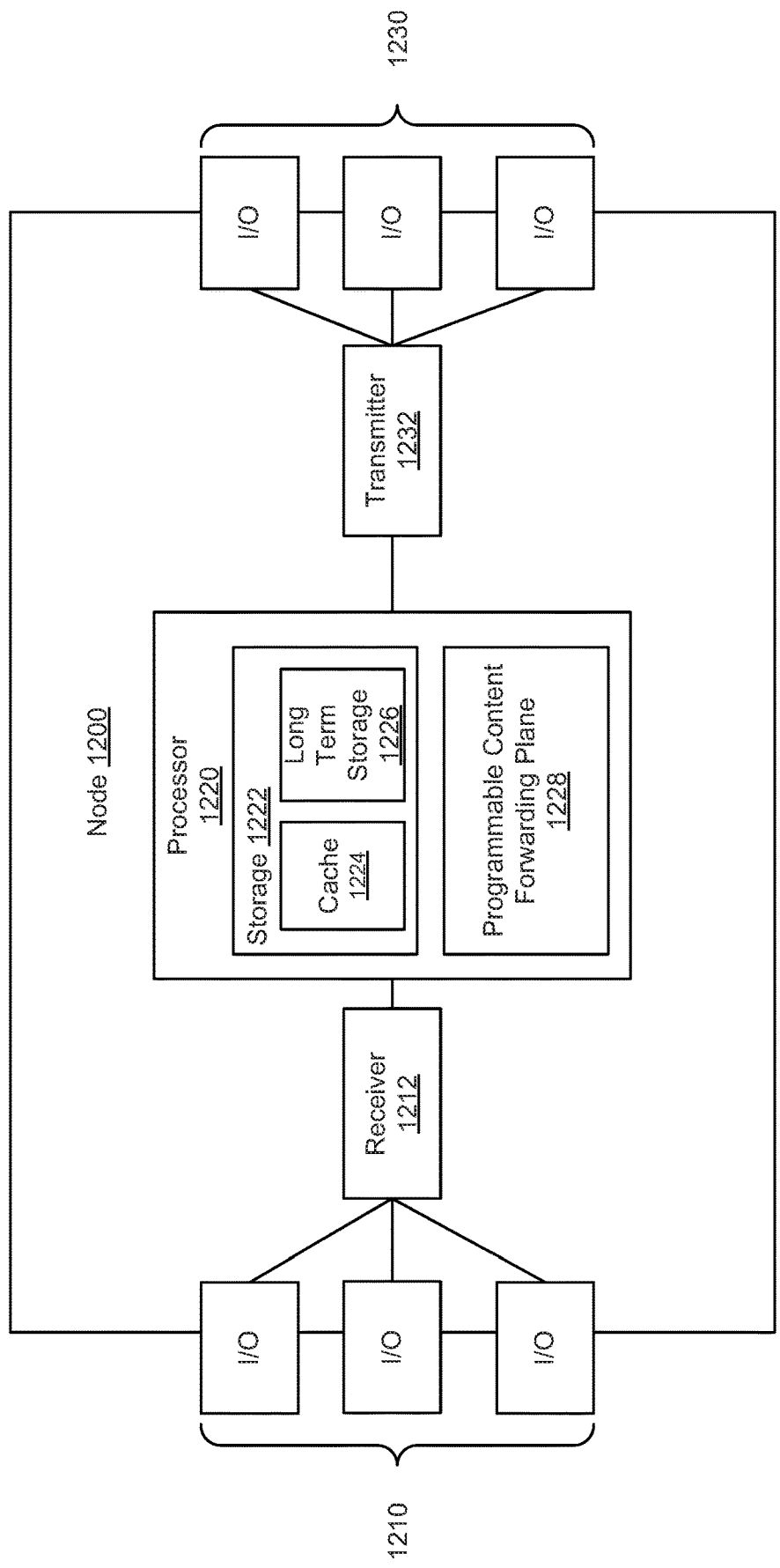
FIG. 12 illustrates an embodiment of a node (e.g., content router) in accordance with embodiments of the disclosure.

FIG. 12 illustrates an embodiment of a node 106 (e.g., content router) in accordance with embodiments of the disclosure. The node 1200 may be, for example, the content router 106 (FIG. 1) or any other node or router as described above in the ICN. The node 1200 may comprise a plurality of input/output ports 1210/1230 and/or receivers (Rx) 1212 and transmitters (Tx) 1232 for receiving and transmitting data from other nodes, a processing system or processor 1220 (or content aware unit), including a storage 1222 and programmable content forwarding plane 1228, to process data and determine which node to send the data. The node 1200 may also receive Interest messages (or packets) and Data messages (packets) as described above. Although illustrated as a single processor, the processor 1220 is not so limited and may comprise multiple processors. The processor 1220 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1220 may be configured to implement any of the schemes described herein, such as the processes illustrated in FIGS. 4, 6, 8, 9A, 9B, 9C, 10, 10A, 10B, 10C, 11, 11A, 11B, 11C, 11D using any one or combination of steps described in the embodiments. Moreover, the processor 1220 may be implemented using hardware, software, or both.

The storage 1222 (or memory) may include cache 1224 and long-term storage 1226, and may be configured to store routing tables, forwarding tables, or other tables or information disclosed herein. Although illustrated as a single storage, storage 1222 may be implemented as a combination of read only memory (ROM), random access memory (RAM), or secondary storage (e.g., one or more disk drives or tape drives used for non-volatile storage of data).

The programmable content forwarding plane 1228 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, FIB)

at the processor 1220. The programmable content forwarding plane 1228 may interpret user requests for content and accordingly fetch content, e.g., based on meta-data and/or content name (prefix), from the network or other content routers and may store the content, e.g., temporarily, in storage 1222. The programmable content forwarding plane 1228 may then forward the cached content to the user. The programmable content forwarding plane 1228 may be implemented using software, hardware, or both and may operate above the IP layer or L2.

Figure 13:
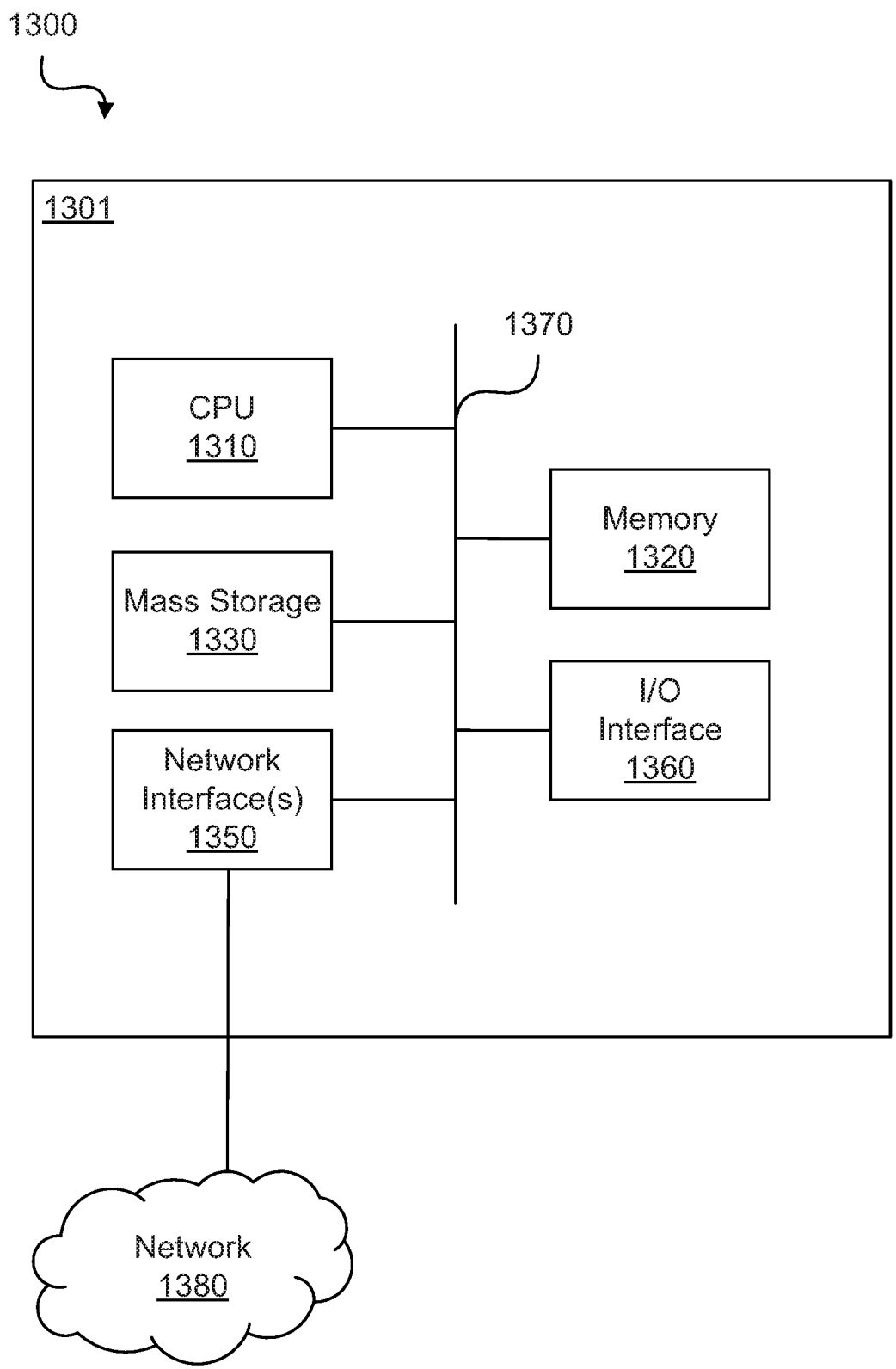
FIG. 13 is a block diagram of a network system that can be used to implement various embodiments.

FIG. 13 is a block diagram of a network system 1300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like.

The CPU 1310 may comprise any type of electronic data processor. The CPU 1310 may be configured to implement any of the schemes described herein, such as the processes illustrated in FIGS. 4, 6, 8, 9A, 9B, 9C, 10, 10A, 10B, 10C, 11, 11A, 11B, 11C, 11D using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "port" will be understood to include a network interface.

Figure 14:
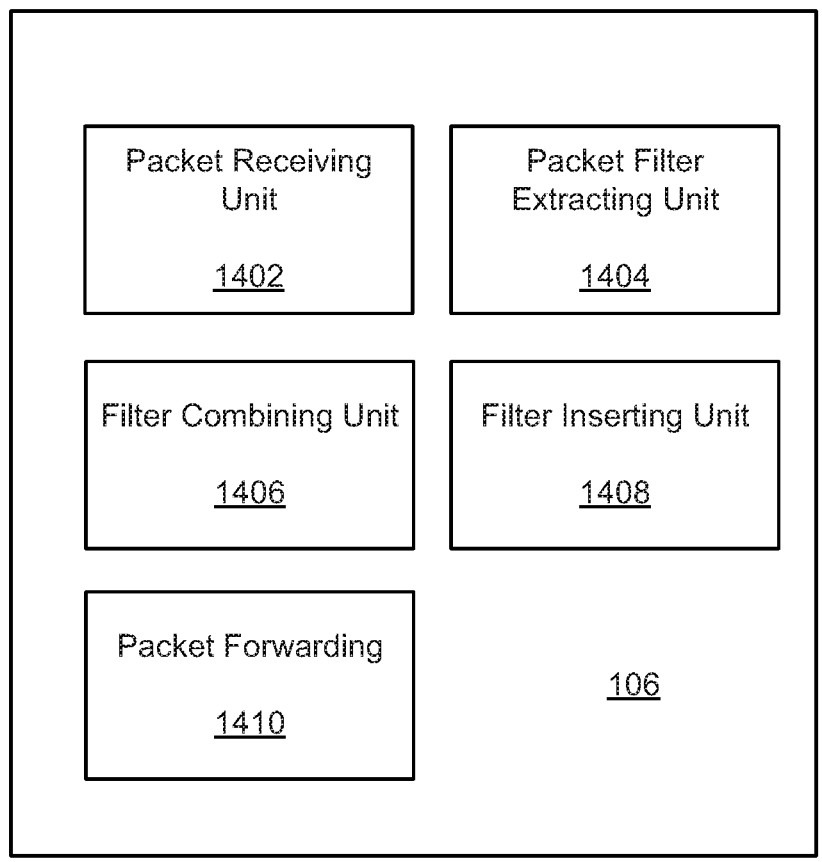
FIG. 14 is a diagram of one embodiment of an apparatus used to forward packets in an ICN.

FIG. 14 is a diagram of one embodiment of an apparatus 1400 used to forward packets in an ICN. In one embodiment, the apparatus 1400 may include a content router 106. In certain embodiments, process 1000 of FIG. 10 may be performed based on apparatus 1400. The apparatus includes packet receiving unit 1402, packet filter extraction unit 1404, filter combining unit 1406, filter inserting unit 1408, and packet forwarding unit 1410, in this embodiment. The various units could be implemented with any combination of hardware and/or software. In general, the packet receiving unit 1402 may be configured to receive either interest or data packets at ports of the apparatus 1400. The packet filter extraction unit 1404 may be configured to extract packet filters from either interest or data packets. The filter inserting unit 1408 may be configured to insert a new filter into either interest or data packets. The packet forwarding unit 1410 may be configured to determine what port to forward the interest or data packet on, and to send the packet on that port.

In one embodiment, the packet receiving unit 1402 receives an interest packet at a first port of the apparatus 1400. The packet filter extraction unit 1404 extracts a packet filter from the interest packet received at a port of the apparatus 1400. The filter combining unit 1406 combines the packet filter with a local filter associated with the port. The packet filter and the local filter are combined without losing information in the packet filter or the local filter, in one embodiment. The filter inserting unit 1408 inserts a new filter into the interest packet based on the combined packet filter and local filter. The packet forwarding unit 1410 forwards the interest packet having the new filter on a second port of the plurality of ports.

The apparatus 1400 is not limited to the example units. In one embodiment, the apparatus 1400 has a bit array determining unit that determines a first array of bits from a filter field in an interest packet received by the packet receiving unit 1402. The apparatus 1400 may further have a combining unit that combines the first array of bits with a second array of bits that define the port on which the interest packet was received to form a third array of bits. The first and second arrays of bits are combined without losing any bits in either the first or the second array, in one embodiment. The filter inserting unit 1408 may insert a filter into the interest packet based on the third array of bits. The packet forwarding unit 1410 may forward the interest packet having the filter on a port of the apparatus 1400.

In some example embodiments, the apparatus 1400 may further include one or more elements for performing any one or combination of steps described in the embodiments. In accordance with various embodiments of the present disclosure, the methods described herein may be implemented using a hardware computer system that executes software programs.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An apparatus comprising:
   a plurality of ports;
   a non-transitory memory storage comprising instructions; and
   one or more processors in communication with the memory and the ports, wherein the one or more processors execute the instructions to:
   extract a packet filter from an interest packet received at a first port of the plurality of ports, wherein the packet filter identifies a port of at least one other apparatus that received the interest packet;
   combine the packet filter with a local filter that identifies the first port, wherein the packet filter and the local filter are combined without losing information in the packet filter or the local filter such that the port of the least one other apparatus is still identifiable;
   insert a new filter into the interest packet based on the combined packet filter and local filter;
   forward the interest packet having the new filter on a second port of the plurality of ports.

2. The apparatus of claim 1, wherein to combine the packet filter with the local filter the one or more processors execute the instructions to include all bits from the packet filter and the local filter in the new filter.

3. The apparatus of claim 1, wherein to combine the packet filter with the local filter the one or more processors execute the instructions to concatenate all bits from the packet filter with all bits of the local filter.

4. The apparatus of claim 1, wherein the packet filter is a first packet filter, wherein the one or more processors execute the instructions to:
   extract a second packet filter from a data packet received at a port of the plurality of ports;
   perform an inverse of the combining of the first packet filter with the local filter on bits derived from the new filter to determine the local filter; and
   determine a port of the plurality of ports on which to forward the data packet based on the local filter.

5. The apparatus of claim 1, wherein the one or more processors execute the instructions to:
   transform the combined packet filter and local filter with information from the interest packet to form the new filter.

6. The apparatus of claim 5, wherein the packet filter is a first packet filter, wherein the one or more processors execute the instructions to:
   extract a second packet filter from a data packet received at a port of the plurality of ports;
   perform an inverse of the transform of the combined packet filter and local filter on the second packet filter;
   perform an inverse of the combining of the first packet filter with the local filter on the second packet filter to determine the local filter; and
   determine a port of the plurality of ports on which to forward the data packet based on the local filter.

7. The apparatus of claim 6, wherein the one or more processors execute the instructions to:
   perform a security check of the data packet based on a comparison of a content name in the data packet with a portion of results of performing the inverse of the transform.

8. The apparatus of claim 1, wherein the packet filter is a first packet filter, wherein the one or more processors execute the instructions to:
   add a first key to the local filter prior to inserting the new filter into the interest packet;
   extract a second packet filter from a data packet received at a port of the plurality of ports;
   extract a second key from the second packet filter;
   drop the data packet if the second key does not match the first key; and
   forward the data packet on a port of the plurality of ports if the second key does match the first key.

9. The apparatus of claim 1, wherein the packet filter is a first packet filter, wherein the one or more processors execute the instructions to:
   add a first signature to the new filter prior to inserting the new filter into the interest packet;
   extract a second packet filter from a data packet received at a port of the plurality of ports;
   extract a second signature from the second packet filter;
   drop the data packet if the second signature does not match the first signature; and
   forward the data packet on a port of the plurality of ports if the second signature does match the first signature.

10. The apparatus of claim 1, wherein the packet filter is a first packet filter, wherein the local filter defines both the first port and the second port, wherein the one or more processors execute the instructions to:
    extract a second packet filter from a data packet received at a port of the plurality of ports;
    determine the second port from the second packet filter;

drop the data packet if the second port does not match the port on which the data packet was received; and forward the data packet if the second port does match the port on which the data packet was received.

11. A method for forwarding packets in an information centric network (ICN), the method comprising:

extracting a packet filter from an interest packet received at an ingress port of a content router in the ICN, wherein the packet filter identifies an ingress port of at least one other content router in the ICN that received the interest packet;

losslessly combining the packet filter with a local filter that identifies the ingress port, wherein losslessly combining does not lose information in the packet filter or the local filter such that the ingress port of the at least one of the content router is still identifiable;

inserting a new filter into the interest packet based on the losslessly combined packet filter and local filter; and forwarding the interest packet having the new filter on an egress port of the content router.

12. The method of claim 11, wherein the packet filter is a first packet filter, further comprising:

extracting a second packet filter from a data packet received at a port of the content router; and statelessly forwarding the data packet based on the second packet filter.

13. The method of claim 11, further comprising:

transforming information from the interest packet; and combining the transformed information with the losslessly combined packet filter and the local filter to form the new filter.

14. The method of claim 13, wherein the information from the interest packet comprises a content name.

15. The method of claim 13, wherein the packet filter is a first packet filter, further comprising:

extracting a second packet filter from a data packet received at a port of the content router;

performing an inverse of the combining the transformed information with the losslessly combined packet filter and local filter on the second packet filter;

performing an inverse of the transforming of the information from the interest packet on results of performing the inverse of the combining;

determining a local filter based on results of performing the inverse of the transforming;

determining a port of the content router based on the determined local filter; and forwarding the data packet on the determined port.

16. A content router, comprising:

a plurality of ports;

a non-transitory memory storage comprising instructions; and one or more processors in communication with the memory, wherein the one or more processors execute the instructions to:

receive an interest packet at a port of the plurality of ports;

determine a first array of bits from a filter field in the interest packet, wherein the first array of bits contains information to identify a port of at least one other content router that received the interest packet;

combine the first array of bits with a second array of bits that define the port on which the interest packet was received to form a third array of bits, wherein the first and second arrays of bits are combined without losing any bits in either the first or the second array, wherein the third array contains the information to identify the port of the at least one other content router;

insert a filter into the interest packet based on the third array of bits; and forward the interest packet having the filter on a port of the content router.

17. The content router of claim 16, wherein the one or more processors execute the instructions to:

transform a content name in the interest packet; and combine the transformed content name with the third array of bits to form the filter.

18. The content router of claim 17, wherein the one or more processors execute the instructions to:

receive a data packet at a port of the plurality of ports;

perform an inverse of combining the transformed content name with the third array of bits on a filter from a filter field in the data packet; and determine a port of the plurality of ports on which to forward the data packet based on a first portion of results of performing the inverse of the combining.

19. The content router of claim 18, wherein the one or more processors execute the instructions to:

access a second portion of the results of performing the inverse of the combining; and perform a security check of the data packet based on a comparison of the second portion with a key or signature.

20. The content router of claim 16, wherein the second array of bits further defines the port of the content router on which the interest packet is forwarded.

* * * * *

UNITED STATES PATENT AND TRADEMARK OFFICE
CERTIFICATE OF CORRECTION

PATENT NO.         : 10,587,515 B2
APPLICATION NO.    : 15/426336
DATED              : March 10, 2020
INVENTOR(S)        : Azgin et al.

Page 1 of 1

It is certified that error appears in the above-identified patent and that said Letters Patent is hereby corrected as shown below:

In the Claims

Column 21, Lines 56-57 (Claim 1, Lines 15-16): After "the" and before "least" insert -- at --

Signed and Sealed this
Sixteenth Day of June, 2020

Andrei Iancu
*Director of the United States Patent and Trademark Office*